United States Patent
Kurosawa et al.

(10) Patent No.: US 12,196,592 B2
(45) Date of Patent: Jan. 14, 2025

(54) MEASURING MECHANISM, AND FIXED-QUANTITY DISPENSING CONTAINER AND FIXED-QUANTITY APPLICATOR INCLUDING THE SAME

(71) Applicants: Taisei Kako Co., Ltd., Osaka (JP); Kaken Pharmaceutical Co., Ltd., Tokyo (JP)

(72) Inventors: Tomohiro Kurosawa, Osaka (JP); Yukihiro Ogawa, Osaka (JP); Tatsuro Nagao, Shizuoka (JP); Hiroshi Iseki, Shizuoka (JP); Keisuke Kinoshita, Shizuoka (JP); Yuki Nishihara, Shizuoka (JP); Takashi Ishimaru, Shizuoka (JP)

(73) Assignees: TAISEI KAKO CO., LTD., Osaka (JP); KAKEN PHARMACEUTICAL CO., LTD., Tokyo (JP)

( * ) Notice: Subject to any disclaimer, the term of this patent is extended or adjusted under 35 U.S.C. 154(b) by 240 days.

(21) Appl. No.: 17/639,517

(22) PCT Filed: Sep. 7, 2020

(86) PCT No.: PCT/JP2020/033747
§ 371 (c)(1),
(2) Date: Mar. 1, 2022

(87) PCT Pub. No.: WO2021/049448
PCT Pub. Date: Mar. 18, 2021

(65) Prior Publication Data
US 2022/0299351 A1    Sep. 22, 2022

(30) Foreign Application Priority Data
Sep. 10, 2019   (JP) ................ 2019-164285

(51) Int. Cl.
*B65D 47/20* (2006.01)
*B65D 47/24* (2006.01)
(Continued)

(52) U.S. Cl.
CPC .......... *G01F 11/32* (2013.01); *B65D 47/2093* (2013.01); *B65D 47/24* (2013.01);
(Continued)

(58) Field of Classification Search
CPC ........ G01F 11/32; G01F 15/005; G01F 11/14; G01F 11/268; B65D 47/2093;
(Continued)

(56) References Cited

U.S. PATENT DOCUMENTS 6,338,425 B1 * 1/2002 Berge .................... B65D 51/18
                                                             222/521
7,988,004 B1 * 8/2011 Marret .................. B65D 51/18
                                                             220/254.8
(Continued)

FOREIGN PATENT DOCUMENTS

JP    55-148066 U1   10/1980
JP    6-69161 U       9/1994
(Continued)

OTHER PUBLICATIONS

International Search Report mailed Oct. 13, 2020 (translation only).
(Continued)

*Primary Examiner* — Frederick C Nicolas
(74) *Attorney, Agent, or Firm* — Wood, Phillips, Katz, Clark & Mortimer

(57) ABSTRACT

A mechanism for measuring an amount of a liquid composition and discharging it, and a quantitative dispensing container and a quantitative applicator including such a mechanism including a base and a head defining a measurement space therebetween. The base and the head are con-
(Continued)

figured to be capable of changing the volume of the measurement space in response to a predetermined operation of the head including a measurement operation for increasing the volume of the measurement space and a discharge operation for reducing the volume of the measurement space. The base includes a first passageway for allowing the composition to flow from the outside into the measurement space, and a first check valve located on the first passageway. The first check valve of the base increases its sealability if there is a positive pressure in the measurement space.

43 Claims, 11 Drawing Sheets

(51) Int. Cl.
| | | |
|---|---|---|
| *B65D 51/18* | (2006.01) | |
| *B65D 51/24* | (2006.01) | |
| *G01F 11/14* | (2006.01) | |
| *G01F 11/26* | (2006.01) | |
| *G01F 11/32* | (2006.01) | |
| *G01F 15/00* | (2006.01) | |

(52) U.S. Cl.
CPC ........... *B65D 47/242* (2013.01); *B65D 51/18* (2013.01); *B65D 51/24* (2013.01); *G01F 11/14* (2013.01); *G01F 11/268* (2013.01); *G01F 15/005* (2013.01); *B65D 2251/0015* (2013.01); *B65D 2251/0087* (2013.01); *B65D 2547/06* (2013.01)

(58) Field of Classification Search
CPC ................ B65D 51/24; B65D 2547/06; B65D 2251/0015; B65D 2251/0087; B65D 47/242; B65D 51/18; B65D 47/24
See application file for complete search history.

(56) References Cited

U.S. PATENT DOCUMENTS

| | | | |
|---|---|---|---|
| 2012/0259277 A1 | 10/2012 | Shay et al. | |
| 2014/0221943 A1* | 8/2014 | Carrara | ............... A61K 31/568 |
| | | | 604/310 |
| 2016/0088921 A1 | 3/2016 | Jo et al. | |
| 2016/0089526 A1* | 3/2016 | Hofland | ............... A61M 35/003 |
| | | | 604/311 |

FOREIGN PATENT DOCUMENTS

| | | |
|---|---|---|
| JP | 2003-75228 A | 3/2003 |
| JP | 3667497 B2 | 7/2005 |
| JP | 6496655 B2 | 5/2017 |
| JP | 2019-23091 A | 2/2019 |
| JP | 2019-81591 A | 5/2019 |
| KR | 2003023270000 B1 | 1/2003 |
| KR | 101452982 B1 | 10/2014 |

OTHER PUBLICATIONS

Written Opinion mailed Oct. 13, 2020.
Product Catalog Z-700-CO14 from Mitani Valve Co., Ltd. (Mar. 29, 2022).
Office Action from the Japanese Patent Office, dated Aug. 5, 2023, for Japanese Patent Application No. 2019-164285 (with English translation).

* cited by examiner

MEASURING MECHANISM, AND FIXED-QUANTITY DISPENSING CONTAINER AND FIXED-QUANTITY APPLICATOR INCLUDING THE SAME

TECHNICAL FIELD

The present invention relates to a measuring mechanism for measuring a predetermined fixed amount or an arbitrary amount of a liquid composition and discharging it, and a quantitative dispensing container and a quantitative applicator including such a mechanism.

BACKGROUND ART

Various quantitative dispensing containers have been offered that can measure out an amount of a liquid composition and discharge it. For example, pumps using common ball valves are widely available on the market, where the user may push in the pump to simultaneously perform a discharge operation and an automatic measurement operation achieved by a spring springing back (reference documents, Product Catalog Z-700-0014 from Mitani Valve Co., Ltd., Japanese Utility Model Application Publication No. Hei6(1994)-69161 A, and so on).

Containers have also been offered that allow the user to always measure a generally fixed amount of liquid and pour it through simple operations. The quantitative liquid pouring container disclosed in Patent Document 1, identified below, includes a container body (A) and a measuring mechanism mounted on the container body (A). The measuring mechanism includes a cylinder (B) attached to the container body (A), and a movable measuring unit (C) defining a measurement space between the cylinder (B) and itself. The cylinder (B) and movable measuring unit (C) are constructed such that the user can increase the volume of the measurement space to its maximum by pulling up the movable measuring unit (C), and reduce it to its minimum by pushing down the movable measuring unit (C). Then, the user can measure a generally fixed amount of liquid content in a measuring cup (19) provided on the upper end of the movable measuring unit (C) by pulling up and pushing down the movable measuring unit (C).

More specifically, a cylindrical coupling member (9) is provided on the lower end of the cylinder (B), and the upper end of a suction pipe (15) is fixed to the cylindrical coupling member (9); the container is constructed such that liquid content sucked up from the bottom of the container body (A) via the suction pipe (15) and cylindrical coupling member (9) flows into the measurement space. Further, a valve seat (11) protrudes from the inner periphery of the cylindrical coupling member (9) and a spherical valve body (12) is placed on the valve seat (11) to form a suction valve (7).

Further, the movable measuring unit (C) includes a suction pipe (18) having a discharge valve (17) and a piston (16) protruding from the outer periphery of the lower end of the suction pipe (18), where the piston (16) is fitted into the cylinder (B).

An outside-air inlet (a) is provided in the peripheral wall of the cylinder (B) toward the top, and is constructed such that the interior of the container body (A) communicates with outside air via the outside-air inlet (a) to maintain the internal pressure of the container body (A) at outside pressure.

To use this conventional quantitative pouring container, an initial operation is first performed where, with the movable measuring unit (C) pushed down, the space in the cylinder (B) located below the measuring unit is filled with liquid. Starting with this state, the movable measuring unit (C) is raised to its highest position, which causes the suction valve (7) to open to cause liquid inside the container body (A) to be introduced into the cylinder (B) via the pipe (15). Thereafter, the movable measuring unit (C) is pushed down to its lowest position, which causes the discharge valve (17) to open and causes a generally fixed amount of liquid in the cylinder (B) to be introduced into the measuring cup (19).

Measuring containers having a function as an applicator have also been offered. For example, the measuring/pouring applicator container disclosed in Patent Document 2, identified below, includes a container body (12), a cap (82), a valve arrangement (60), an applicator head (76), and a measuring device (38) including a measurement space (46). To take medicinal liquid from the container body (12) of Patent Document 2 and use it, the cap (82) is first rotated about its axis to pull it up and remove it. At this time, as the cap (82) is being pulled up, the valve (60) and applicator head (76) are pulled up and slide. At this time, the second valve of the valve arrangement (60) is closed while the first valve is opened such that the interior space of the container body (12) communicates with the measuring device (38), achieving a measurement state.

With this measurement state kept, the container body (12) is inverted, which causes the medicinal liquid in the container body (12) to flow into the measurement space (46) of the measuring device (38) and fill it such that a fixed amount is measured. With this state kept, the container is brought to a surface to which the liquid is to be applied, such as head skin, and the applicator head (76) is pressed on this surface. This causes the valve arrangement (60) to be pushed down to the measuring device (38), where the first valve is closed and the second valve moves away from the valve seat such that only the amount of medicinal liquid filling the measurement space (46) is discharged.

PRIOR ART DOCUMENTS

Patent Documents

[Patent Document 1] Japanese Patent No. 3667497
[Patent Document 2] Japanese Patent No. 6496655

SUMMARY OF THE INVENTION

Problems to be Solved by the Invention

In the case of a pump using a common ball valve, the user pushes in the pump to simultaneously perform the discharge operation and the automatic measurement operation achieved by the springing-back of the spring. However, especially when a composition with low viscosity is to be measured and discharged, tilting the pump during operation causes the ball valve to move, impairing the ability to keep a fixed quantity. Further, since the amount of discharge from a pump is not necessarily proportional to the amount of pushing-in, the user has difficulty discharging an arbitrary amount. Further, such a pump has a large number of parts, meaning high manufacturing costs. Thus, one problem to be solved by the present invention is to provide a measuring mechanism that is completely different from pumps using common ball valves, and, specifically, to provide a measuring mechanism that has a small number of parts, can be manufactured at low costs, can be easily used by the user, and is capable of measuring an arbitrary amount desired by the user and discharging it. Another problem to be solved by the present invention is to provide a quantitative applicator and a quantitative dispensing container that includes such a measuring mechanism.

The conventional quantitative pouring container described in Patent Document 1 includes a suction valve mainly composed of a spherical valve body that is positioned on top of the valve seat by virtue of its own weight. As such, when the container is tilted during a discharge operation, the spherical valve body rolls to leave the valve seat such that some of the composition that has been sucked into the cylinder may flow backward, making it impossible to discharge the exact measured amount.

Further, the conventional quantitative pouring container described in Patent Document 1 includes an outside-air inlet located in the peripheral wall of the cylinder toward the top, which is always open; as such, when the container lies on its side or is inverted upside down, liquid content may leak through the outside-air inlet. In view of this, yet another problem to be solved by the present invention is to provide a measuring mechanism that does not lose its measurement performance and discharge performance even when it is tilted, and a quantitative applicator or a quantitative dispensing container including such a measuring mechanism.

The conventional measuring/pouring applicator container described in Patent Document 2 includes a first valve and a second valve that integrally form a valve arrangement, which is coupled to the applicator head. The valve arrangement moves up and down as the applicator head is pulled up and pushed down, and is an on/off valve that switches between an opened state and a closed state, rather than a check valve; moreover, the closing of the measurement space and container body occurs at the same time as the measurement space being allowed to communicate with outside air such that, when the container is tilted during use, or for some magnitudes of pull-up force or push-in force (including push-in speed), some of the composition may flow backward or leak, which may prevent proper measurement. Furthermore, not only do the degrees of backward flow and liquid dripping vary depending on pull-up or push-in forces, but those parameters also depend on the viscosity of the composition; as such, the measuring/pouring applicator container described in Patent Document 2 cannot be said to be a measuring/pouring applicator container that can be used with various medicinal liquids with different viscosities.

In addition, the measuring/pouring applicator container described in Patent Document 2 requires that the container be first inverted and then the measurement space be filled with liquid and, with this inverted state kept, discharge occur, which means a complicated operation for the user and can easily cause an error. In view of this, still another problem to be solved by the present invention is to provide a quantitative applicator, or a quantitative dispensing container having a function as an applicator, that prevents a liquid composition from leaking or spurting during discharge and allows the composition to be appropriately and easily applied to a body surface.

Means for Solving the Problems

To solve the above-identified problems, the present inventors did extensive research to devise a measuring mechanism that does not rely on tilting of the container or other units and allows the user to easily measure an amount of a composition and discharge it, and the inventors found that the above-identified problems can be solved by a measuring mechanism including a base and a head defining a measurement space between the base and itself, where the base and head are constructed such that the volume of the measurement space can be changed, i.e., increased and decreased, by a predetermined operation of the head.

Further, the present inventors found that a quantitative dispensing container composed of a combination of the above-described measuring mechanism of the present invention with a container body is capable of measurement and discharge even when the container is tilted, and is useful as a quantitative dispensing container for liquid medicines and cosmetics.

Subsequently, the present inventors attempted to design a measuring mechanism including an application surface having a function as an applicator, and found that a quantitative applicator with liquid discharge outlets for the measuring mechanism provided in the application surface, in which a plurality of liquid discharge outlets are provided to create a distributed flow is capable of preventing the composition from spurting even when a discharge operation is done quickly. In addition, it was found that liquid dripping is prevented if the application surface is formed by generally flush surfaces and an embankment is provided. The present inventors did further research and revealed that such a quantitative applicator can be easily used to apply a pharmaceutical preparation or a cosmetic product to a body surface with little liquid dripping or spurting, and thus is very useful for a user.

Furthermore, the present inventors found various necessary medical or cosmetic treatment, cure or prevention methods for a body surface by using the above-described quantitative applicator to apply a pharmaceutical preparation or a cosmetic product to the body surface, and thus made the present invention directed to a measuring mechanism, a quantitative dispensing container and a quantitative applicator.

That is, the present invention includes the following embodiments.

(1) A quantitative dispensing container including a container body for preserving a liquid composition and a measuring mechanism mounted on the container body, the measuring mechanism including a base attached to the container body and a head defining a measurement space between the base and the head, the base and the head constructed such that a volume of the measurement space is changeable by an operation of the head, the base including a first passageway adapted to allow the composition to flow from a supplier (e.g., interior of the container body) into the measurement space, and a first check valve located on the first passageway, the head including a second passageway adapted to discharge the composition inside the measurement space to an outside, and a second check valve located on the second passageway, the first check valve of the base including a valve body having such an outer-surface geometry that its sealability increases as a pressure inside the measurement space increases. The measuring mechanism may alternatively be one of the measuring mechanisms of (8) to (21) described below.

(2) The quantitative dispensing container described in (1), wherein a generally flat valve seat is provided on the first passageway, the valve body of the first check valve is shaped as a plate adapted to abut the valve seat in a direction toward the container body away from the measurement space and has an upper surface adapted to receive a pressure in the measurement space so as to increase sealability.

(3) The quantitative dispensing container described in (2), wherein the valve body of the first check valve is shaped as a disk, and only the upper surface and a peripheral surface are exposed to the measurement space when pressures in the measurement space and the outside are substantially equal or when the pressure in the measurement space is a positive pressure relative to the pressure in the outside.

(4) The quantitative dispensing container described in (2) or (3), wherein the first check valve includes an elastic support adapted to support a periphery of the valve body so as to bias the valve body toward the valve seat.

(5) The quantitative dispensing container described in any one of (1) to (4), wherein an outside-air inlet is provided in the base or the container body, the outside-air inlet is adapted to communicate an interior of the container body with outside air, the first check valve is adapted to operate to become open by virtue of a difference between a negative pressure inside the measurement space generated as the volume of the measurement space has been increased by an operation of the head, on one hand, and an outside pressure within the container body, on the other, and the second check valve is adapted to operate to become open by virtue of a difference between a pressure inside the measurement space generated when the volume of the measurement space has been reduced by an operation of the head, on one hand, and the outside pressure, on the other.

(6) The quantitative dispensing container described in (5), wherein
the outside-air inlet is located in the base,
a plug being provided in the head for closing the outside-air inlet when the volume of the measurement space is at its minimum, and opening the outside-air inlet when the head has been operated to increase the measurement space.

(7) The quantitative dispensing container described in (6), wherein the plug is formed by a distal end of a cylinder defining the measurement space.

(8) A measuring mechanism for measuring a liquid composition,
the measuring mechanism including a base and a head defining a measurement space between the base and the head,
the base including a first passageway adapted to allow the liquid composition to flow from a supplier into the measurement space, and a first check valve located on the first passageway,
the head including a second passageway adapted to discharge the composition inside the measurement space to an outside, and a second check valve located on the second passageway,
the measuring mechanism adapted to discharge a measured amount of the composition to the outside in response to a predetermined operation of the head including a measurement operation for increasing a volume of the measurement space and a discharge operation for reducing the volume of the measurement space, the measured amount being a predetermined fixed amount or an arbitrary amount.

(9) The measuring mechanism described in (8), wherein
the head adapted to, during the measurement operation, be pulled up relative to the base to open the first check valve while the second check valve remains closed such that the liquid composition flows into the measurement space defined by the base and the head to measure the predetermined fixed amount or the arbitrary amount, and
the head adapted to, during the discharge operation, be pushed down relative to the base such that the first check valve is closed and the second check valve is opened to discharge the measured amount of the composition to the outside.

(10) The measuring mechanism described in (8) or (9), wherein a valve seat is provided on the first passageway, a valve body of the first check valve being located closer to the measurement space than the valve seat is, and
the first check valve is a check valve adapted to:
a) be closed by the valve body of the first check valve abutting the valve seat on the first passageway in a direction toward the supplier away from the measurement space when pressures in the measurement space and the outside are substantially equal, and
b) be opened when the pressure in the measurement space is a negative pressure relative to the pressure in the supplier, and
wherein a valve seat is provided on the second passageway, a valve body of the second check valve being located closer to the outside than the valve seat is, and
the second check valve is a check valve adapted to:
c) be closed by the valve body of the second check valve abutting the valve seat on the second passageway in a direction toward the measurement space away from the outside when the pressures in the measurement space and the outside are substantially equal, and
d) be opened when the pressure in the measurement space is a positive pressure relative to the pressure in the outside.

(11) The measuring mechanism described in (10), wherein
the valve seat on the first passageway is generally flat, and the first check valve is further is configured to:
f) increase sealability when the pressure in the measurement space is a positive pressure relative to the pressure in the supplier.

(12) The measuring mechanism described in any one of (8) to (11), wherein a valve body of the first check valve is shaped as a disk made of a material containing silicone, and only an upper surface and a peripheral surface of the valve body are exposed to the measurement space when the pressures in the measurement space and the supplier are substantially equal or when the pressure in the measurement space is a positive pressure relative to the pressure in the supplier.

(13) The measuring mechanism described in any one of (8) to (12), wherein the first check valve has an elastic support adapted to support a periphery of the valve body so as to bias the valve body toward the valve seat.

(14) The measuring mechanism described in any one of (8) to (13), wherein the composition is a composition to be applied to a body surface of a human, the composition being a pharmaceutical preparation or a cosmetic product offered in the form of a liquid preparation, a lotion preparation, a cream preparation, an ointment preparation, a light ointment preparation, a foam preparation, a liniment preparation, or a gel preparation.

(15) The measuring mechanism described in any one of (8) to (14), wherein the composition is a pharmaceutical preparation having a viscosity at 25° C. not higher than 100000 mPa·s.

(16) The measuring mechanism described in any one of (8) to (15), wherein the composition is a pharmaceutical preparation having a viscosity at 25° C. not higher than 95000 mPa·s.

(17) The measuring mechanism described in any one of (8) to (16), wherein the composition is a pharmaceutical preparation having a viscosity at 25° C. not higher than 30000 mPa·s.

(18) The measuring mechanism described in any one of (8) to (17), wherein the composition is a pharmaceutical preparation having a viscosity at 25° C. not higher than 1000 mPa·s.

(19) The measuring mechanism described in any one of (8) to (18), wherein the composition is a pharmaceutical preparation to be applied to a body surface of a human to cure, prevent or treat mycosis, tinea unguium, atopic dermatitis, psoriasis, pruritus, pain, rosacea, wounds, decubitus, epidermolysis bullosa, xeroderma pigmentosum, congenital leukopathia, hypogonadism, or hyperhidrosis.

(20) The measuring mechanism described in any one of (8) to (18), wherein the composition is a pharmaceutical preparation to be applied to a body surface of a human to cure, prevent or treat mycosis, hypogonadism, or hyperhidrosis.

(21) The measuring mechanism described in (16), wherein the composition is a pharmaceutical preparation to be applied to an axilla of a human to cure, prevent or treat hypogonadism or hyperhidrosis.

(22) A quantitative applicator including a measuring mechanism and an application surface, wherein the measuring mechanism is the measuring mechanism described in any one of (8) to (21), and
the application surface is an application surface provided on an upper side of the head to hold the measured amount of the composition discharged by the predetermined operation of the head so as to be applied to a body surface.

(23) The quantitative applicator described in (22), wherein the application surface is an upper surface of a head body, an upper surface of a liquid holder provided on the upper side of the head body, or a combination of an upper surface of the head body and an upper surface of the liquid holder.

(24) The quantitative applicator described in (22) or (23), wherein the second passageway includes one or more liquid discharge outlets open in the application surface.

(25) The quantitative applicator described in (24), wherein a plurality of liquid discharge outlets for the second passageway are located in a middle of the application surface.

(26) The quantitative applicator described in (24) or (25), wherein the application surface is a flat surface, a concave surface or a convex surface having no hole nor projection except for the liquid discharge outlet for the second passageway.

(27) The quantitative applicator described in any one of (22) to (26), wherein a shape of the application surface as viewed in a plan view is a circle or an ellipse.

(28) The quantitative applicator described in (27), wherein the shape of the application surface as viewed in a plan view is a circle with a diameter of 20 mm to 45 mm, or an ellipse with a minor axis and a major axis of 20 mm to 45 mm.

(29) The quantitative applicator described in any one of (22) to (25), wherein a shape of the application surface as viewed in a plan view is a circle with a diameter of 20 mm to 45 mm or an ellipse with a minor axis and a major axis of 20 mm to 45 mm, the application surface is a flat surface, a concave surface or a convex surface having no hole nor projection except for the liquid discharge outlet, and the application surface is surrounded by an embankment provided on its periphery.

(30) A quantitative dispensing container including a container body capable of containing a liquid composition and a quantitative applicator, wherein the quantitative applicator is the quantitative applicator described in any one of (22) to (29),
wherein the base of the measuring mechanism included in the quantitative applicator is a base attached to the container body, and the measurement space and an interior of the container body are capable of communicating with each other via the first passageway, the interior of the container body constituting the supplier.

(31) The quantitative dispensing container described in (30), wherein an outside-air inlet for communicating the interior of the container body with outside air is provided in the base or the container body.

(32) The quantitative dispensing container described in (30) or (31), wherein the outside-air inlet is provided in the base, and
a plug is provided in the head for closing the outside-air inlet when the volume of the measurement space is at its minimum, and opening the outside-air inlet when the head has been operated to increase the measurement space.

(33) A method for curing, preventing or treating a disease in a human by applying a pharmaceutical preparation on a body surface of the human, comprising:
a) providing a quantitative dispensing container including a container body capable of containing a liquid pharmaceutical preparation and a measuring mechanism mounted on the container body,
the measuring mechanism including a base attached to the container body and a head defining a measurement space between the base and the head,
the measuring mechanism including an application surface adapted to apply the pharmaceutical preparation to the body surface,
the base including a first passageway adapted to allow the pharmaceutical preparation to flow from an interior of the container body into the measurement space, and a first check valve located on the first passageway,
the head including a second passageway adapted to discharge the pharmaceutical preparation inside the measurement space such that it stays on the application surface, and a second check valve located on the second passageway,
the measuring mechanism adapted to discharge a measured amount of the pharmaceutical preparation to an outside in response to a predetermined operation of the head including a measurement operation for increasing a volume of the measurement space and a discharge operation for reducing the volume of the measurement space, the measured amount being a predetermined fixed amount or an arbitrary amount;
b) measuring the predetermined fixed amount or the arbitrary amount by the first check valve being opened when the head is pulled up relative to the base while the second check valve remains closed such that the pharmaceutical preparation flows into the measurement space defined by the base and the head,
c) discharging the measured amount of the pharmaceutical preparation such that it stays on the application surface by the first check valve being closed and the second check valve being opened when the head is pushed down relative to the base; and d) applying the discharged pharmaceutical preparation on the application surface to the body surface.

(34) The method described in (33), wherein the body surface is an axilla.

(35) The method described in (33) or (34), wherein the disease is mycosis, psoriasis, atopic dermatitis, pruritus, hypogonadism, or hyperhidrosis.

The present invention further includes the following embodiments.

(1A) A quantitative dispensing container including a container body for containing a liquid composition and a measuring mechanism mounted on the container body,
the measuring mechanism including a base attached to the container body and a head defining a measurement space between the base and the head,
the base including a first passageway adapted to allow the composition to flow from an interior of the container body into the measurement space, and a first check valve located on the first passageway,
the head including a second passageway adapted to discharge the composition inside the measurement space so that it stays on the application surface, and a second check valve located on the second passageway,
the measuring mechanism being capable of measuring, and discharging to the application surface, a predetermined fixed amount or an arbitrary amount of the composition in response to a predetermined operation of the head including a measurement operation for increasing a volume of the measurement space and a discharge operation for reducing the volume of the measurement space.

(8A) A measuring mechanism for measuring a liquid composition,
the measuring mechanism including a base and a head defining a measurement space between the base and the head,
the base including a first passageway adapted to allow the liquid composition to flow from a supplier into the measurement space, and a first check valve located on the first passageway,
the head including a second passageway adapted to discharge the composition inside the measurement space to an outside, and a second check valve located on the second passageway,
the first check valve of the base including a valve body having such an outer-surface geometry that its sealability increases as a pressure inside the measurement space increases,
the measuring mechanism being capable of measuring, and discharging to the outside, a predetermined fixed amount or an arbitrary amount of the composition in response to a predetermined operation of the head including a measurement operation for increasing a volume of the measurement space and a discharge operation for reducing the volume of the measurement space.

(22A) A quantitative applicator including a measuring mechanism and an application surface,
the measuring mechanism being a measuring mechanism adapted to measure an amount of a liquid composition,
the measuring mechanism including a base and a head defining a measurement space between the base and the head,
the base including a first passageway adapted to allow the liquid composition to flow from a supplier into the measurement space, and a first check valve located on the first passageway,
the head including a second passageway adapted to discharge the composition inside the measurement space through the application surface so that the composition stays thereon, and a second check valve located on the second passageway,
the measuring mechanism being a measuring mechanism capable of measuring, and discharging to the application surface, a predetermined fixed amount or an arbitrary amount of the composition in response to a predetermined operation of the head including a measurement operation for increasing a volume of the measurement space and a discharge operation for reducing the volume of the measurement space,
the application surface being an application surface provided adjacent to an upper surface of the head for receiving the measured composition discharged in response to the predetermined operation of the head and for applying the composition to a body surface.

Effects of the Invention

A measuring mechanism according to the present invention, and a quantitative dispensing container and a quantitative applicator including such a mechanism are capable of measuring a predetermined fixed amount or an arbitrary amount and discharging it even when the measuring mechanism is tilted during a measurement operation or a discharge operation. Thus, the measuring mechanism etc. of the present invention are suitable as a container for a pharmaceutical preparation or a cosmetic product. For example, they are particularly useful as an antiperspirant container that can be carried by the user in his/her hand to easily perform a measurement operation, a discharge operation and an application operation for the composition. Further, the measuring mechanism etc. of the present invention are advantageous because of their small number of parts and because they can be manufactured at low costs.

EMBODIMENTS FOR CARRYING OUT THE INVENTION

Figure 1:
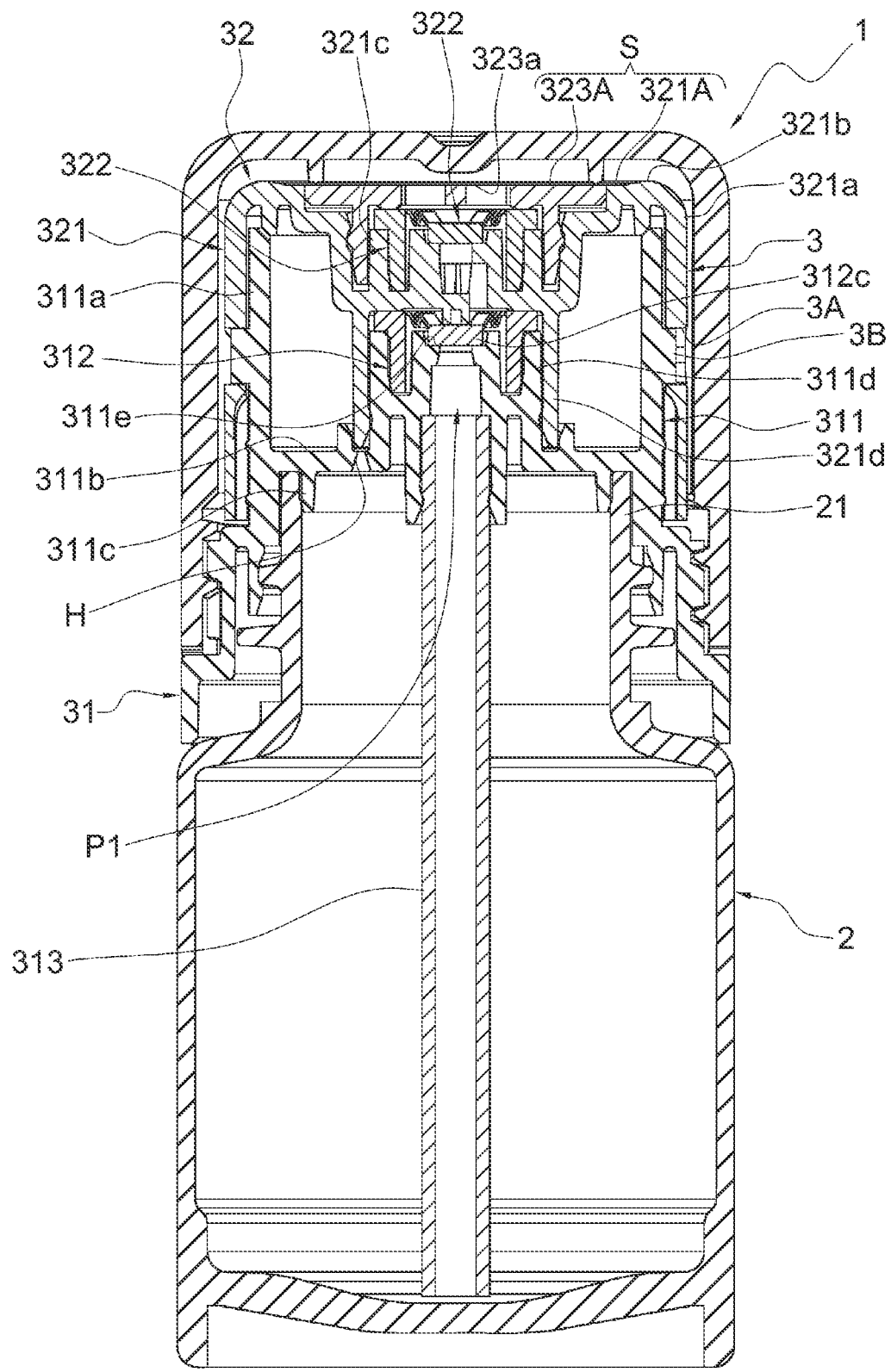
FIG. 1 is a longitudinal cross-sectional view of an entire quantitative dispensing container according to an embodiment of the present invention.

Hereinafter, embodiments of the measuring mechanism, quantitative dispensing container and quantitative applicator of the present invention, as well as their various components, are explained.

The measuring mechanism of the present invention includes a base and a head, where a measurement space is formed between the base and head. The user performs an operation to slide the head up and down relative to the base such that the volume of the measurement space varies. The quantitative dispensing container and quantitative applicator encompassed by the present invention includes such a measuring mechanism. As used herein, the terms indicating directions such as "up/down", "high/low" and "vertical", mean directions as found when the container is stationary as shown in accompanying FIG. 1.

The base of the measuring mechanism of the present invention includes a base body and a first check valve located on a first passageway, the first passageway located in the base body for allowing a liquid composition to flow from a supplier (e.g., interior of the container body) into the measurement space. The head of the measuring mechanism of the present invention includes a head body and a second check valve located on a second passageway, the second passageway located in the head body for discharging the composition inside the measurement space to the outside (e.g., on the application surface). Further, the head of the measuring mechanism of the present invention may include a liquid holder for branching out the second passageway toward a plurality of liquid discharge outlets to prevent the composition from spurting forcefully even when the discharge operation is quickly performed. The measuring mechanism of the present invention is capable of measuring, and discharging to the outside, a predetermined fixed amount or an arbitrary amount of the composition in response to a predetermined operation of the head including a measurement operation for increasing the volume of the measurement space and a discharge operation for reducing the volume of the measurement space. Hereinafter, the side of the first check valve adjacent to the supplier (e.g., side adjacent to the container body) is also referred to as primary side, whereas the side adjacent to the measurement space as secondary side. Further, the side of the second check valve adjacent to the measurement space is also referred to as primary side, whereas the side toward the outside (e.g., side adjacent to the application surface) is also referred to as secondary side.

More specifically, the base provided in the measuring mechanism of the present invention includes a base body, a first passageway for allowing a composition to flow from a supplier (e.g., interior of the container body) provided outside of the measuring mechanism into a measurement space, and a first check valve located on the first passageway. Thus, when the pressure on the secondary side (i.e., side adjacent to the measurement space) is lower than the pressure on the primary side (i.e., side adjacent to the container body, for example) of the first check valve, this difference in pressure causes the first check valve to open such that the composition flows into the measurement space from the supplier via the first passageway. In an embodiment of the present invention, the first passageway may include a suction pipe. As described further below, in a quantitative dispensing container including a container body and the above-described measuring mechanism, it is preferable that a suction pipe is provided.

The head provided in the measuring mechanism of the present invention includes a head body, a second passageway for discharge the composition in the measurement space to the outside (e.g., on the application surface), and a second check valve located on the second passageway. Thus, when the pressure on the primary side of the second check valve (i.e., inner pressure in the measurement space) is higher than the pressure on the secondary side (i.e., outside pressure), this difference in pressure causes the second check valve to open such that the composition is discharged from the measurement space to the outside via the secondary passageway.

Thus, in the measuring mechanism of the present invention, the differences in pressure among the supplier, the outside and the measurement space cause the first and second check valve open and close alternately to measure an amount of a liquid composition and discharge it. It is understood that the pressures in the supplier and the outside may be made equal by causing the supplier to be open toward the outside or causing the supplier to communicate with the outside. The above-described measurement and discharge are implemented by the user performing an operation to slide the head up and down relative to the base to vary the volume of the measurement space.

The "operation" mentioned above includes a measurement operation and a discharge operation. As used herein, "measurement operation" means an operation for increasing the volume of the measurement space, and, specifically, an operation where the user manually pulls up the head relative to the base such that the first check valve is opened while the second check valve remains closed, thereby causing the composition to flow from a supplier (e.g., interior of the container body) into a measurement space provided between the base and head to measure a predetermined fixed amount or an arbitrary amount. As used herein, "discharge operation" means an operation for reducing the volume of the measurement space, and, specifically, an operation where the user manually pushes down the head relative to the base such that the first check valve is closed while the second check valve is opened, thereby discharging a measured amount of the composition to the outside (e.g., on the application surface).

During the measurement operation, a negative pressure is generated on the measurement-space side relative to the pressure on the supply-unit side (e.g., container-body side) and the resulting opening of the first check valve causes the composition to flow into the measurement space. At this time, the second check valve is closed by the negative pressure on the measurement-space side relative to the pressure on the side toward to the outside (e.g., application-surface side). On the other hand, during the discharge operation, a positive pressure is generated on the measurement-space side relative to the pressure on the side toward the outside (e.g., on the application-surface side) and the resulting opening of the second check valve causes the composition to flow to the outside (e.g., on the application surface). At this time, the first check valve is closed by the positive pressure on the measurement-space side relative to the pressure on the supply-unit side.

In one embodiment of the present invention, the base may include a protrusion on the outer surface of the base side, while the head may include a guide groove for engagement with that protrusion. In such an embodiment, the head of the measuring mechanism of the present invention can slide up and down relative to the base, where the stroke is specifiable by means of the protrusion and the guide groove for engagement therewith. As used herein, "stroke" means a distance for which the head slides relative to the base in the vertical direction, and the increase/decrease in stroke is generally proportional to the increase/decrease in the volume of the measurement space. That is, the volume of the measurement space is at its minimum when the protrusion is at one end of the guide groove, whereas the volume of the measurement space is at its maximum when the protrusion is at the other end of the guide groove.

The guide groove may be constituted by one slot extending in the vertical direction; however, the guide groove may be any groove that allows the head to be pulled up. For example, the guide groove may be helical in shape. In such implementations, the head rotates about its axis while moving in axial directions (i.e., vertical directions).

In one embodiment of the present invention, the amount of the composition that can be measured is not limited to one amount. For example, the volume of the measurement space can be adjusted if steps or the like are provided halfway along the guide groove, or a scale or the like is provided. Thus, measuring mechanisms capable of measuring two different amounts and measuring mechanisms capable of measuring an arbitrary amount and discharging it by means of a plurality of steps or a scale halfway along the guide groove are encompassed by the present invention.

In one embodiment of the present invention, the protrusion does not slip out of the guide groove during a normal manual operation; thus, the measuring mechanism etc. of the present invention allows the user to easily measure a predetermined fixed amount or an arbitrary amount of a composition. As used herein, "measuring mechanism etc. of the present invention" means all the inventions disclosed herein including the measuring mechanism according to the present invention and the quantitative dispensing container and the quantitative applicator including such a mechanism.

Next, the check valves used in the measuring mechanism etc. of the present invention are described in detail. As used herein, check valve means a valve having the function of always keeping the flow of a liquid in one direction and preventing backward flow. In one implementation of the present invention, a preferable check valve loses little of its ability to keep a fixed quantity even when tilted during operation. In one implementation of the present invention, a preferable check valve includes a valve body having such an outer-surface geometry that its sealability increases with increasing pressure in the measurement space. In one implementation of the present invention, a more preferable check valve loses little of its ability to keep a fixed quantity even when tilted during operation and includes a valve body having such an outer-surface geometry that its sealability increases with increasing pressure in the measurement space.

In the measuring mechanism of the present invention, the base includes a first passageway and a first check valve, while the head includes a second passageway and a second check valve. In the measuring mechanism of the present invention, the volume of the measurement space can be varied by sliding the base and head up and down. As each of the first and second passageways is provided with a check valve, effectively no backflow of the liquid composition normally occurs during the process of the measurement and discharge operations.

In one implementation of the present invention, a check valve included in the measuring mechanism of the present invention includes a valve body, elastic supports and a valve base. The first and second passageways are each provided with a valve seat capable of abutting a valve body. In one implementation of the present invention, the valve body of a check valve is located closer to the secondary side than the valve seat is; when the pressures on the primary and secondary sides are substantially equal, the valve body, by virtue of the elastic support members, abuts the valve seat in the direction toward the primary side away from the secondary side to close the associated passageway.

In one implementation of the present invention, a check valve included in the measuring mechanism of the present invention is such that, when the pressure on the secondary side becomes lower than the pressure on the primary side in response to the above-described measurement operation, the elasticity of the elastic support members cannot resist the difference in pressure anymore such that the valve body moves toward the secondary side. As a result, the passageway is opened and, at the same time, the difference in pressure causes the composition to flow from the primary to the secondary side. On the other hand, when the pressure on the secondary side becomes higher than the pressure on the primary side in response to the above-described discharge operation, the valve body is kept closed. In one implementation of the present invention, a preferable check valve is such a check valve that, when the pressure on the secondary side is higher than the pressure on the primary side, the sealability increases with increasing difference in pressure. A measuring mechanism including such a check valve is preferable because it has a high sealability and is thus capable of measuring a predetermined fixed amount or an arbitrary amount independent of a tilt of the measuring mechanism.

The first check valve provided in the base preferably includes a valve body having such an outer-surface geometry that, when there is a positive pressure in the measurement space, the sealability increases as that pressure increases. In such implementations, when the pressure on the secondary side of the first check valve (i.e., inside the measurement space) becomes higher than the pressure on the primary side in response to the discharge operation, the difference in pressure causes the sealability with respect to the valve seat of the valve body to increase. Thus, for example, when the measurement space is filled with a fixed amount of a composition and, with this state kept, the head is operated so as to reduce the volume of the measurement space, this causes the pressure in the measurement space to rise, and this higher pressure increases the sealability of the valve body of the first check valve. This ensures that the first check valve functions even when the measurement operation is being done with the container tilted, thereby discharging a predetermined fixed amount or an arbitrary amount of the composition.

More specifically, in one implementation of the present invention, the first check valve of the present invention is preferably a check valve that includes a generally flat valve seat provided on the first passageway, the valve body of the first check valve being located adjacent to the secondary side (i.e., measurement-space side) and being a disk-shaped valve body that abuts the valve seat in the direction toward the primary side (e.g., container-body side) away from the secondary side (i.e., measurement-space side).

In one implementation of the present invention, a more preferable check valve of the present invention is a check valve that further includes an upper surface (i.e., secondary-side surface) that receives pressure in the measurement space in such a way that its sealability increases and, when the valve body is closed, the lower surface (i.e., primary-side surface) abuts the valve seat. In such implementations, for example, a plate-shaped valve body is preferable because its upper surface receives pressure in the measurement space and its lower surface abuts the valve seat such that the sealability achieved by forces acting on the upper surface is maximized.

In one implementation of the present invention, the first check valve is preferably a check valve that includes a valve body shaped as a polygonal plate, an elliptical plate or a disk, wherein only the upper surface (i.e., secondary-side surface) and peripheral surface of the valve body are exposed to the measurement space during the discharge operation. In such implementations, the upper surface (i.e., primary-side surface) of the valve body abuts the valve seat and, as a result, no forces are applied to the valve body that would cancel the sealability-creating forces acting on the upper surface of the valve body, thereby maximizing sealability. This further ensures that the valve body of the first check valve is closed on the valve seat during the discharge operation such that the valve body does not leave the valve seat even when the measurement mechanism is tilted, thereby allowing an exact measured amount to be discharged. Examples of polygonal plates include triangular plates, rectangular plates, pentagonal plates, hexagonal plates, heptagonal plates, and octagonal plates.

In one implementation of the present invention, the first check valve may include elastic supports for supporting the periphery of the valve body so as to bias the valve body in the direction toward the primary side, and thus toward the valve seat, away from the secondary side. Thus, after the measurement operation (i.e., operation of the head for increasing the volume of the measurement space), when the composition flows into the measurement space and eliminates the negative pressure in the measurement space such that there is substantially no difference between the pressures on the primary and secondary sides, then, the biasing forces of the elastic supports bias the valve body onto the valve seat to close the valve seat even if the discharge operation (i.e., operation of the head for reducing the volume of the measurement space) has not been initiated. This prevents backflow of the composition at the first check valve even if a user unfamiliar with the series of steps of the measurement operation is performing the operation.

In one implementation of the present invention, the valve body of each of the check valves is preferably formed from a soft material that can bend appropriately to increase sealability. For example, an elastic body is preferable; specific examples include silicone rubber, natural rubber, and thermoplastic elastomer. A combination of some or all of these materials may be used. In one implementation of the present invention, each of the check valves of the present invention is composed of a valve body, elastic supports and a valve base; preferably, these components of the check valve are formed integrally from one material. More preferably, each check valve includes a valve body, elastic supports and valve base formed integrally from an elastic material, and a check valve integrally formed from silicone is particularly preferable. On the other hand, in some implementations of the present invention, the valve seat provided on a passageway may be a hard member or may be a soft member; preferably, the valve seat is constituted by a hard member. It is preferable that a valve seat and the associated passageway are integrally formed, and it is more preferable that they are formed integrally with the base body or head body.

In one implementation of the present invention, the first check valve is opened by the difference between the negative pressure in the measurement space and the outside pressure inside the container body as found when the volume of the measurement space has been increased by an operation of the head. In one implementation of the present invention, the second check valve is opened by the difference between the positive pressure in the measurement space and the outside pressure as found when the volume of the measurement space has been decreased by an operation of the head. In one typical implementation of the present invention, the measuring mechanism of the present invention measures an amount of the composition and discharges it as the volume of the measurement space is varied between its minimum and maximum; alternatively, a scale may be provided, or a stroke may be specifiable by means of a guide groove and a protrusion, where an amount of the composition may be measured in accordance with that stroke.

In one implementation of the present invention, the first and second check valves may be identical check valves. Alternatively, it is permissible that the first and second check valves have different geometries, as long as they have the above-described functions. It is preferable that the measuring mechanism includes the above-described preferred check valves.

Next, the quantitative dispensing container according to the present invention is described.

According to the present invention, the quantitative dispensing container is a container including the above-described measuring mechanism and a container body for containing a liquid composition. In addition, the container may include other members; for example, it may include an applicator member for applying the liquid composition to the body surface, and/or a cap.

In one implementation of the present invention, the container body is generally shaped as a cylinder, an elliptic cylinder or a polygonal tube. Preferably, the container body is generally shaped as a cylinder or elliptic cylinder, and more preferably generally shaped as a cylinder. In one implementation of the present invention, a preferred container body has a circular transverse section with a diameter of 20 mm to 45 mm, or an elliptical transverse section with a minor axis and a major axis of 20 mm to 45 mm. A more preferred container body has a circular transverse section with a diameter of 20 mm to 45 mm, or an elliptical transverse section with a minor axis and a major axis of 20 mm to 45 mm and, in effect, is generally shaped as a cylinder when viewed from the outside.

In one typical implementation of the present invention, the quantitative dispensing container of the present invention is provided with the above-described measuring mechanism on the opening at the top of the container body. In one implementation of the present invention, it is preferable that the first passageway of the measuring mechanism is provided with a suction pipe. In such an implementation, it is preferable that one end of the suction pipe is positioned such that its opening is at the bottom of the internal space of the container body that contains the composition, and the other end is attached to the base so as to communicate with the first passageway; alternatively, the first passageway of the base may extend to a position near the bottom of the container body.

In one implementation of the present invention, the quantitative dispensing container may include an outside-air inlet in the base or container body for communicating the interior of the container body with outside air. The outside-air inlet is preferably located in the base or in the container body toward the top to prevent leakage of the liquid during use. In one implementation of the present invention, a preferred measuring mechanism includes an outside-air inlet in the base. Further, the head may be provided with a plug that closes the outside-air inlet when the volume of the measurement space is at its minimum and opens the outside-air inlet when the head has been operated so as to increase the measurement space. In such an implementation, before the measurement operation, the head may be operated to a position that results in the minimum volume of the measurement space such that the plug closes the outside-air inlet to prevent the composition from leaking through the outside-air inlet. On the other hand, during the measurement operation, the outside-air inlet is opened for any head position that results in a volume of the measurement space that is not the minimum, thereby maintaining the internal space of the container body at a pressure equal to the outside pressure such that a predetermined fixed amount or an arbitrary amount can be measured and discharged even when the measurement and discharge operations are repeated.

More preferably, the plug may be constituted by a distal end of a cylinder that defines the measurement space. In such an implementation, the distal end of a cylinder defining the measurement space can function as a plug, thereby providing a simple structure of the measuring mechanism and a compact device structure.

A preferred quantitative dispensing container includes the above-described preferred container body. A more preferred quantitative dispensing container includes the above-described preferred container body and the above-described preferred measuring mechanism.

Next, the quantitative applicator according to the present invention is described.

The quantitative applicator according to the present invention is an applicator that includes the above-described measuring mechanism and an application surface. In addition, the applicator may further include other components; for example, it may include a container body for containing a liquid composition and/or a cap.

As used herein, "application surface" means a surface for applying a liquid composition to the body surface; generally, a device including an application surface is referred to as "applicator". An application surface serves to hold a liquid composition, convey it to the body surface, apply it thereto, and spread it thereover.

In one typical implementation of the present invention, an application surface is provided adjacent to the top surface of the head of the measuring mechanism of the present invention. The application surface of the present invention may be any surface that has a function as an applicator; specifically, it may be the top surface of the head body which constitutes part of the outer surface thereof, or the top surface of a liquid holder provided adjacent to the top surface of the head body. Alternatively, it may be a combination of the top surface of the head body and the top surface of the liquid holder. In an application surface made up of a combination of the top surface of the head body and the top surface of the liquid holder, the top surface of the head body is positioned around the outer periphery of the liquid holder.

In one implementation of the present invention, a liquid holder is a member provided with a liquid discharge outlet for the second passageway. In one implementation of the present invention, the liquid holder is provided to branch out the second passageway toward a plurality of liquid discharge outlets to dampen the force of a spurting liquid composition during discharge of the composition. The liquid holder may take various forms. For example, in one implementation of the present invention, the liquid holder may form part or all of the application surface. In one implementation of the present invention, the liquid holder, together with the top surface of the head body, may form the application surface. In one implementation of the present invention, the liquid holder may cover the head body. In such an implementation, the above-described guide groove and the associated components may also be covered.

In one implementation of the present invention, the second passageway include one or more liquid discharge outlets open in the application surface. For example, if a plurality of liquid discharge outlets are provided in the application surface, it is preferable that these outlets are located at the center of the application surface and arranged annularly.

In one implementation of the present invention, a plurality of liquid discharge outlets for the second passageway are provided at the center of the application surface. This prevents the composition from forcefully spurting from the liquid discharge outlets. In one implementation of the present invention, the application surface is preferably a flat surface, a concave surface or a convex surface having no hole nor projection except for the liquid discharge outlets. More preferably, the member constituting the application surface (i.e., liquid holder and/or head body) is a hard member.

In one implementation of the present invention, the shape of the application surface as viewed in a plan view is preferably a circle or an ellipse. In one implementation of the present invention, the shape of the application surface as viewed in a plan view is preferably a circle with a diameter of 20 mm to 45 mm, or an ellipse with a minor axis and a major axis of 20 mm to 45 mm. Yet more preferably, the application surface may be surrounded by an embankment provided on its periphery. The embankment has the function of working together with the application surface to hold a liquid composition, and the function of working together with the application surface to convey the liquid composition to the body surface, apply it thereto and spread it thereover.

In one implementation of the present invention, an embankment shaped as a circular ring or an elliptical ring is preferably provided along the outermost periphery of the application surface. In one implementation of the present invention, it is more preferable that an embankment shaped as a circular ring or an elliptical ring is provided along the outermost periphery of the application surface, and the embankment and application surface together form a generally concave composition-holding member. A yet more preferable quantitative applicator in one implementation of the present invention is such that an embankment shaped as a circular ring or an elliptical ring is provided along the outermost periphery of the application surface, the embankment and application surface together form a generally concave composition-holding member, the application surface has no hole nor projection except for the liquid discharge outlets for the second passageway, and the members constituting the application surface are hard members.

A preferred quantitative applicator includes the above-described preferred application surface. A more preferred quantitative applicator includes the above-described preferred application surface and the above-described preferred measuring mechanism. A yet more preferred quantitative applicator includes the above-described preferred application surface, the above-described preferred container body and the above-described preferred measuring mechanism.

Next, various terms used herein are explained.

As used herein, "viscosity" has the same meaning as consistency, and indicates the magnitude of resistance to the flow of a liquid. The viscosity of a liquid is higher than 0 mPa·s.

As used herein, "composition" means a pharmaceutical preparation or a cosmetic product to be applied to the body surface of a human. A composition suitable for the measuring mechanism etc. of the present invention is a liquid composition. As used herein, "liquid composition" should be broadly interpreted, and may be, for example, a pharmaceutical preparation offered in the form of a liquid preparation, a lotion preparation, a cream preparation, an ointment preparation, a light ointment preparation, a foam preparation, a liniment preparation, or a gel preparation, and is preferably a gel preparation, but not limited to any specific composition as long as it can be measured by the measuring mechanism etc. of the present invention.

A composition suitable for the measuring mechanism etc. of the present invention is a preparation having a viscosity not higher than 100,000 mPa·s, and more preferably a preparation having a viscosity not higher than 950,000 mPa·s, and yet more preferably a preparation having a viscosity not higher than 30,000 mPa·s, and still more preferably a preparation having a viscosity not higher than 3,000 mPa·s. In another implementation of the present invention, a composition suitable for the measuring mechanism etc. of the present invention is a preparation having a viscosity not higher than 1,000 mPa·s. The viscosity may be a viscosity at a predetermined temperature, for example 25° C.

In one implementation of the present invention, a composition suitable for the measuring mechanism etc. of the present invention is a composition to be applied to a body surface. As used herein, "body surface" typically means a skin surface of a human, for example. Specifically, it means a skin surface on a limb, the trunk, the head or the like, and more specifically a skin surface on a palm, the face, a shoulder, the chest, a buttock, the abdomen, the back, the pubes, an axilla or the like, or hair, a nail or the like. In one implementation of the present invention, the body surface suitable for application (i.e., application location) is not limited to any particular one; for example, a skin surface is preferable, and a skin surface of an axilla or the like is particularly preferable.

The composition described herein may contain at least one or more active ingredients that act on a human body. The active ingredients may be various physiologically active substances, such as, but not limited to, antifungal agents, antibacterial agents, hormone substitutes, analgesics, respiratory drugs, mycosis remedies, tinea unguium remedies, skin disease remedies (remedies for atopic dermatitis, psoriasis, pruritus, rosacea, etc.), wound remedies, decubitus remedies, epidermolysis bullosa remedies, xeroderma pigmentosum remedies, congenital leukopathia remedies, hypogonadism remedies, hyperhidrosis remedies, antiperspirants, whitening agents, moisturizing agents or the like.

In one implementation of the present invention, a liquid composition suitable for the measuring mechanism etc. of the present invention is preferably a composition containing an antifungal agent. In one implementation of the present invention, a liquid composition suitable for the measurement mechanism etc. of the present invention is preferably a composition containing efinaconazole. In one implementation of the present invention, a liquid composition suitable for the measuring mechanism etc. of the present invention is preferably a pharmaceutical preparation to be administered on an axilla. In one implementation of the present invention, a liquid composition suitable for the measuring mechanism etc. of the present invention is preferably a hyperhidrosis remedy or an antiperspirant. In one implementation of the present invention, a liquid composition suitable for the measuring mechanism etc. of the present invention is preferably a composition containing aluminum chloride. In one implementation of the present invention, a liquid composition suitable for the measuring mechanism etc. of the present invention is preferably a composition containing glycopyrronium or a pharmacologically permissible salt thereof. In one implementation of the present invention, a liquid composition suitable for the measuring mechanism etc. of the present invention is preferably a composition containing oxybutynin or a pharmacologically permissible salt thereof. In one implementation of the present invention, a liquid composition suitable for the measuring mechanism etc. of the present invention is preferably a hypogonadism remedy. In one implementation of the present invention, a liquid composition suitable for the measuring mechanism etc. of the present invention is preferably a pharmaceutical preparation containing testosterone as an active ingredient.

In one implementation of the present invention, the composition described herein is prepared as a pharmaceutical preparation or a cosmetic product that can contain one or more carriers or excipients selected from the group consisting of a solvent, a cosolvent, a permeation promoter, a pH adjuster, and a viscosity adjuster. In one implementation of the present invention, the composition described herein contains a thickener, such as HPC or HPMC.

The cure, prevention or treatment of a disease in a human suitable for the measuring mechanism etc. of the present invention preferably include those of mycosis, psoriasis, atopic dermatitis, pruritus, hypogonadism, palmar hyperhidrosis, and axillary hyperhidrosis. In such implementations, the measuring mechanism etc. of the present invention is used to discharge a pharmaceutical preparation and apply it to a body surface at least once a day. For example, the measuring mechanism etc. of the present invention may be used a plurality of times a day as necessary; for convenience of use, the method of the present invention is usually carried out once a day to four times a day.

As used herein, "application operation" means an operation for applying a liquid composition to a body surface. Specifically, it means an operation in which a liquid composition is discharged so as to stay on the application surface and, with this state kept, the container is held by the hand and pressed onto a desired location on the body surface to apply the discharged composition.

Now, the various embodiments of the present invention are described in further detail with reference to the accompanying drawings. It is understood that the following description is exemplary only and is not intended to limit the technical scope of the present invention to these embodiments. In the drawings, the same or corresponding components are labeled with the same reference characters and the overlapping description are omitted.

FIGS. 1 to 7 show a container 1 that constitutes the quantitative dispensing container according to an embodiment of the present invention. The container 1 of the present embodiment is used to contain a liquid pharmaceutical preparation or cosmetic product that constitutes the composition and, in response to a predetermined measurement operation, discharge a predetermined fixed amount or an arbitrary amount of the composition so as to stay on the application surface and, with the discharged composition kept thereon, apply it to the body surface of the user (for example, an axilla).

The container 1 includes a container body 2 constituted by a cylindrical bottle with a bottom, having an opening 21, and a measuring mechanism 3 mounted on the opening 21 of the container body 2. The measuring mechanism 3 includes a base 31 attached to the opening 21 of the container body 2 and a head 32 defining a measurement space between the base 31 and itself. The base 31 and head 32 are constructed to be slidable relative to each other up and down by an operation for rotating the head 32 to change the volume of the measurement space from a predetermined minimum and a predetermined maximum.

The base 31 includes a base body 311 attached to the opening 21, and a first check valve 312 attached to the base body 311. The base body 311, as attached to the opening 21, seals the opening 21 of the container body 21 in a liquid-tight manner except for a first passageway P1 and an outside-air inlet H, described further below.

The base body 311 includes an outer cylindrical side 311a. A lower portion of the outer cylindrical side 311a is fitted externally onto the opening 21 of the container body 2. An upper portion of the outer cylindrical side 311a functions as a support portion for supporting the head 32 such that the head can move in axial directions and rotate about the axis. At a predetermined location on the upper portion of the outer cylindrical side 311a is provided a protrusion 3B that can engage a guide groove 3A provided on the outer cylindrical side 321a of the head body 321. Alternatively, a guide groove 3A may be located on the base 31 and a protrusion 3B may be located on the head 32. The guide groove 3A may be a recessed groove that helically extends a range of a predetermined rotational angle, for example, 90°. While the guide groove in the implementation shown is a hole that extends through the wall in a radial direction, the guide groove need not extend through the wall. It is understood that a helical guide groove may extend clockwise or counterclockwise. Further, in the implementation shown, two guide grooves 3A are located diametrically opposite to each other, and two protrusions 3B are analogously located.

The base body 311 includes a partition 311b located halfway along the axial direction of the outer cylindrical side 311a. The partition 311b covers the top of the opening 21 of the container body 2 to tightly seal the opening 21. In the implementation shown, to ensure sealability, a cylindrical seal 311c is provided on the partition 311b so as to be fitted into the end of the opening 21 in a liquid-tight manner.

At the center, i.e., around the axis, of the partition 311b is provided a base cylinder 311d having a first passageway P1 along its axis for allowing the composition to flow from the interior of the container body 2 into the measurement space. The axis of the base cylinder 311d matches the axis of the outer cylindrical side 311a of the base body 311. A suction pipe 313 is provided, with its top end fitted into the bottom of the base cylinder 311d so as to allow the composition to be sucked from the bottom of the container body 2 and flow into the first passageway P1. A valve seat 311a is provided inside the base cylinder 311d to communicate with the first passageway P1, and a first check valve 312 is provided above the valve seat 311e to open and close the opening on the upper end of the first passageway P1.

Figure 2:
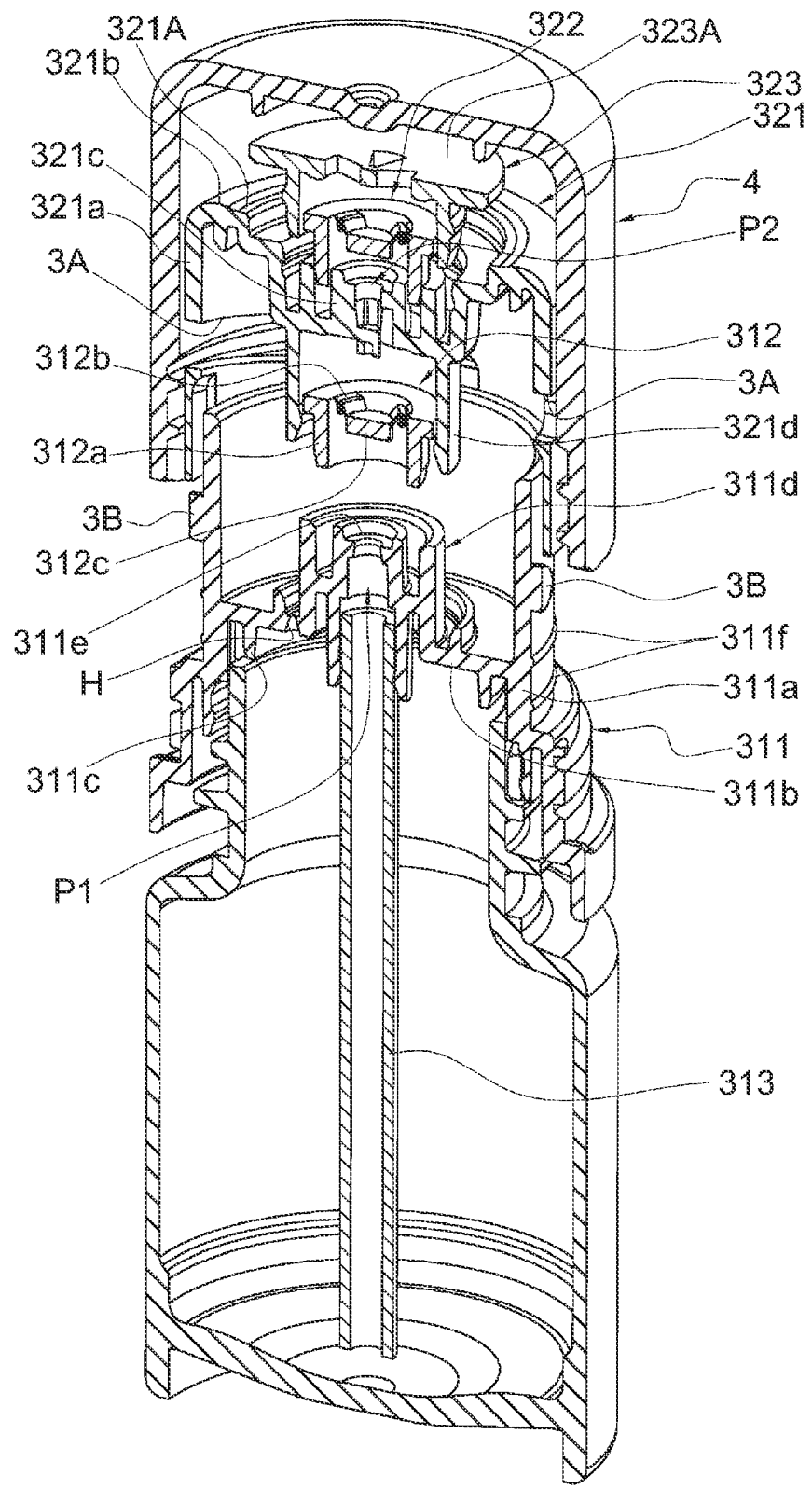
FIG. 2 is an exploded perspective longitudinal cross-sectional view of the container of FIG. 1.
Figure 8:
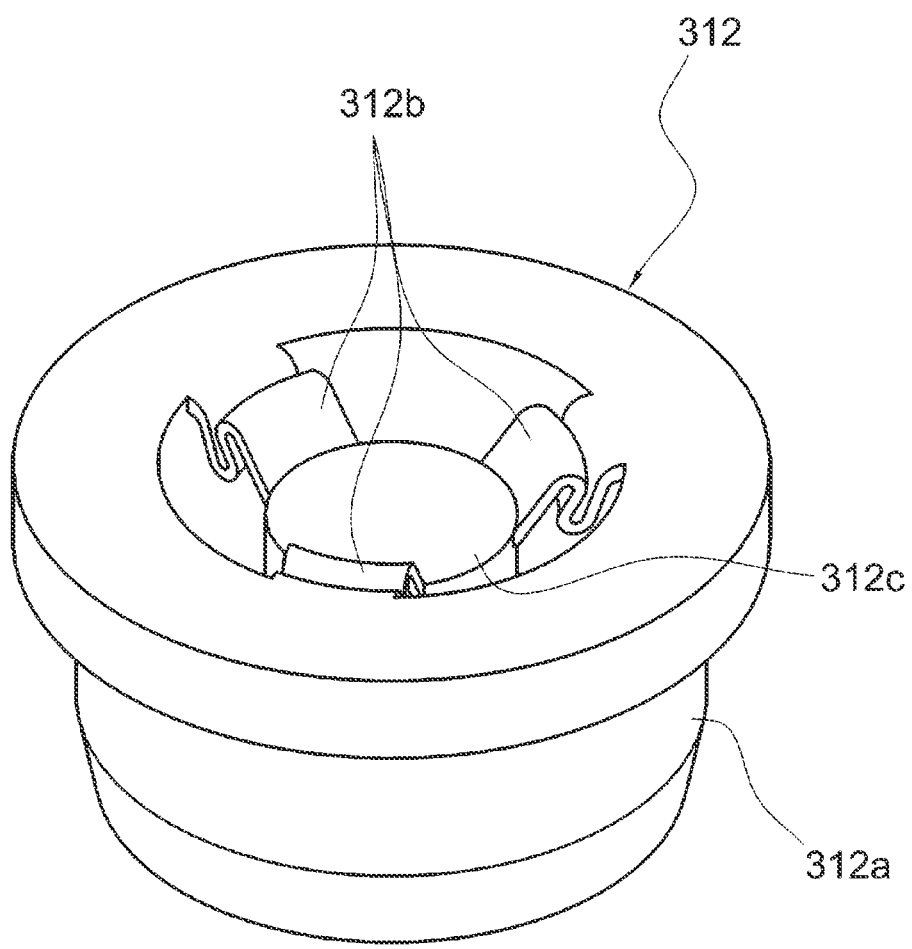
FIG. 8 is an enlarged perspective view of the first check valve in the container of FIG. 1.

As shown in FIG. 2, the first check valve 312 includes a generally cylindrical valve base 312a and a valve body 312c shaped as a disk and supported by elastic supports 312b so as to be elastically movable in axial directions inside the valve base 312a. In the first check valve 312, as shown in its enlarged view of FIG. 8, the base cylinder 311d is constructed as a double cylinder, where the valve base 312a is fitted into the outer cylindrical side of the base cylinder 311d in a liquid-tight manner. A flange is formed integrally with the top end of the valve base 312 to extend outwardly in radial directions, the flange being in contact with the upper end surface of the outer cylindrical side of the base cylinder 311d.

The first check valve 312 may be made of silicone, for example. To ensure that there is a passage for the composition between the peripheral side of the valve body 312c and the inner peripheral side of the valve base 312a and ensure that the valve body 312c is elastically supported in a stable manner, a plurality of elastic supports 312b are preferably arranged circumferentially with an equal distance; for example, three elastic supports 312b may be arranged circumferentially with an equal distance.

An annular valve seat 311e is provided at the upper end of the base cylinder 311d and at the opening of the first passageway P1 such that, when the peripheral edge of the lower surface of the valve body 312c of the first check valve 312 contacts the valve seat 311e, the first passageway P1 is sealed. The elastic supports 312b are biased so as to push the valve body 312c onto the valve seat 311e from the top (i.e., secondary side) toward the bottom (i.e., primary side) as viewed in FIG. 1. The biasing forces are relatively weak; thus, when an operation of the head 32 creates a negative pressure in the measurement space, the difference between the pressure on the secondary side of the valve body 312c (i.e., side adjacent to the measurement space, which is the upper surface of the valve body) and the pressure on the primary side (i.e., side adjacent to the container body, which is the lower surface of the valve body) causes the valve body 312c to leave the valve seat 311e against the biasing forces.

The head 32 includes: a head body 321 attached to the base body 311 by virtue of the engagement between the helical guide groove 3A and protrusion 3B so as to be helically movable in a range of a predetermined angle; a second check valve 322 attached to the head body 321; and a liquid holder 323 having an upper surface for holding the composition discharged through the second check valve 322.

The head body 321 includes an outer cylindrical side 321a. In the implementation shown, the outer cylindrical side 321a of the head body 321 is fitted externally onto the outer cylindrical side 311a of the base body 311; alternatively, it may be fitted into the base body.

Figure 3:
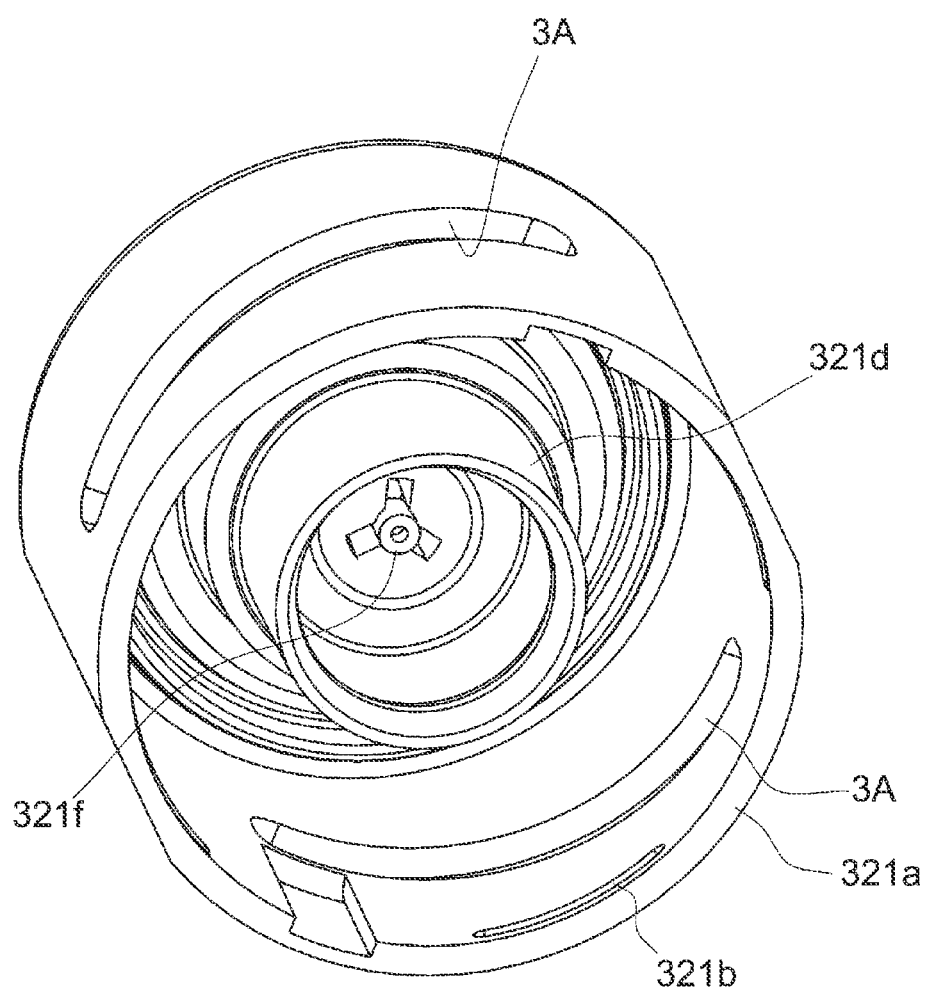
FIG. 3 is an enlarged perspective view of the head of the container of FIG. 1, as viewed from the bottom.

As shown in FIGS. 2 and 3, two protruding strips 311f are provided on the outer peripheral surface of the outer peripheral side 311a of the base body 311, the protruding strips extending circumferentially and separated from each other in the axial direction, and protruding strips 321b are provided on the inner peripheral surface of the outer peripheral side 321a of the head body 321. When the head 32 is rotated to its highest position (i.e., position that results in the maximum volume of the measurement space), the protruding strips 321b of the head body 321 move over the upper one of the two protruding strips 311f on the outer peripheral side 311a of the base body 311 and engage the upper face of the upper protruding strip. On the other hand, when the head 32 is rotated to its lowest position (i.e., position that results in the minimum volume of the measurement space), the protruding strips 321b of the head body 321 move over the lower one of the two protruding strips 311f on the outer peripheral side 311a of the base body 311 and engage the lower face of the lower protruding strip. Thus, the user can feel a click when he/she has operated the head 32 to the highest or lowest position so that he/she can easily notice that the operation has reached the appropriate rotational position.

The head body 321 includes a top plate that is recessed downward, and a cylindrical discharge portion 321c and a head cylinder 321d are provided at the center, i.e., at or near the axis, of this top plate, the cylindrical discharge portion having a second passageway P2 along its axis for discharging a measured amount of the composition inside the measurement space to the outside, the head cylinder being fitted externally onto the base cylinder 311d, the cylindrical discharge portion and head cylinder arranged in the axial direction. The cylindrical discharge portion 321c extends upward from the top plate, while the head cylinder 321d extends downward from the top plate.

Figure 4:
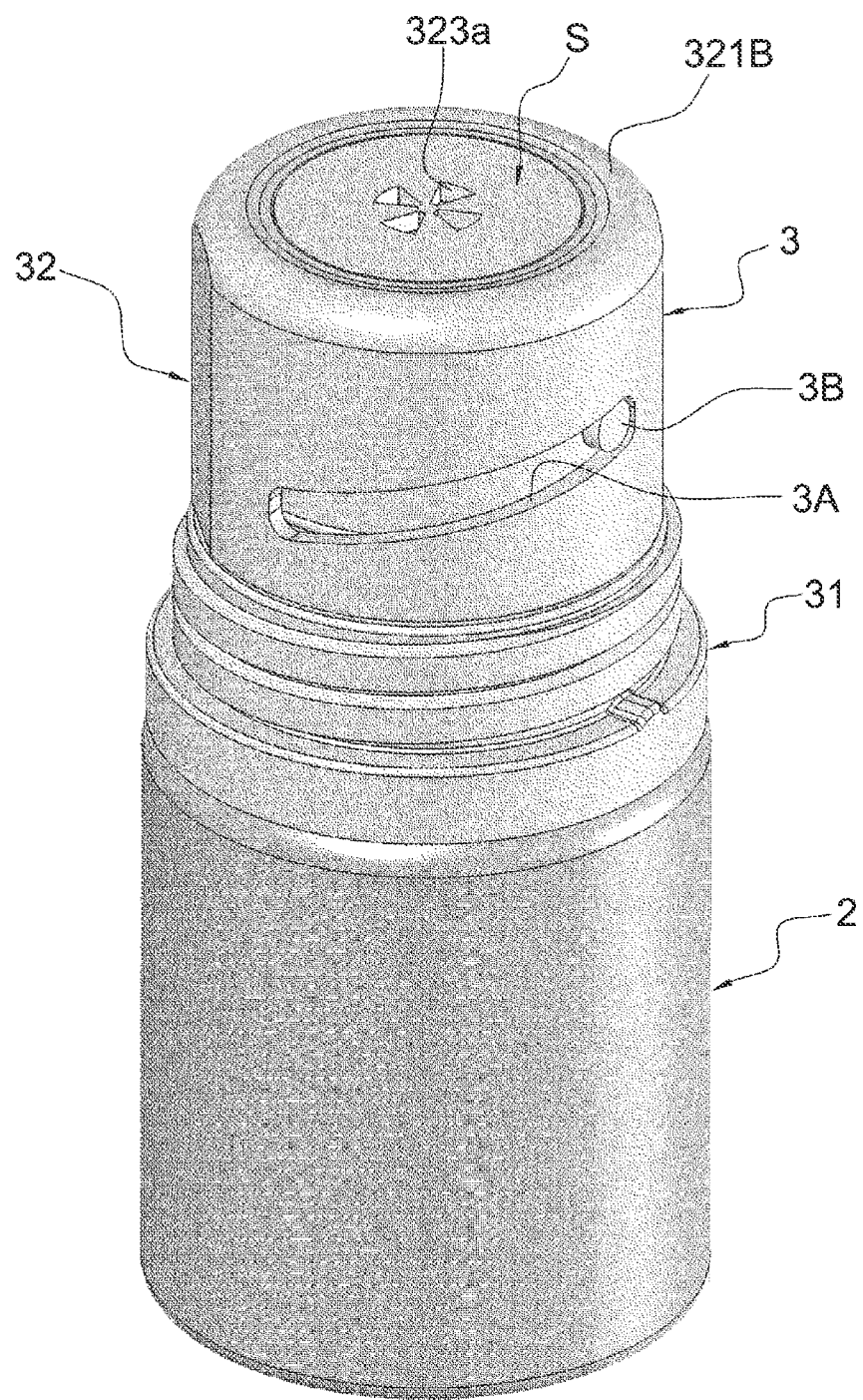
FIG. 4 is a perspective view of the container of FIG. 1 as found when the head has been operated such that the measurement space is at is minimum.
Figure 5:
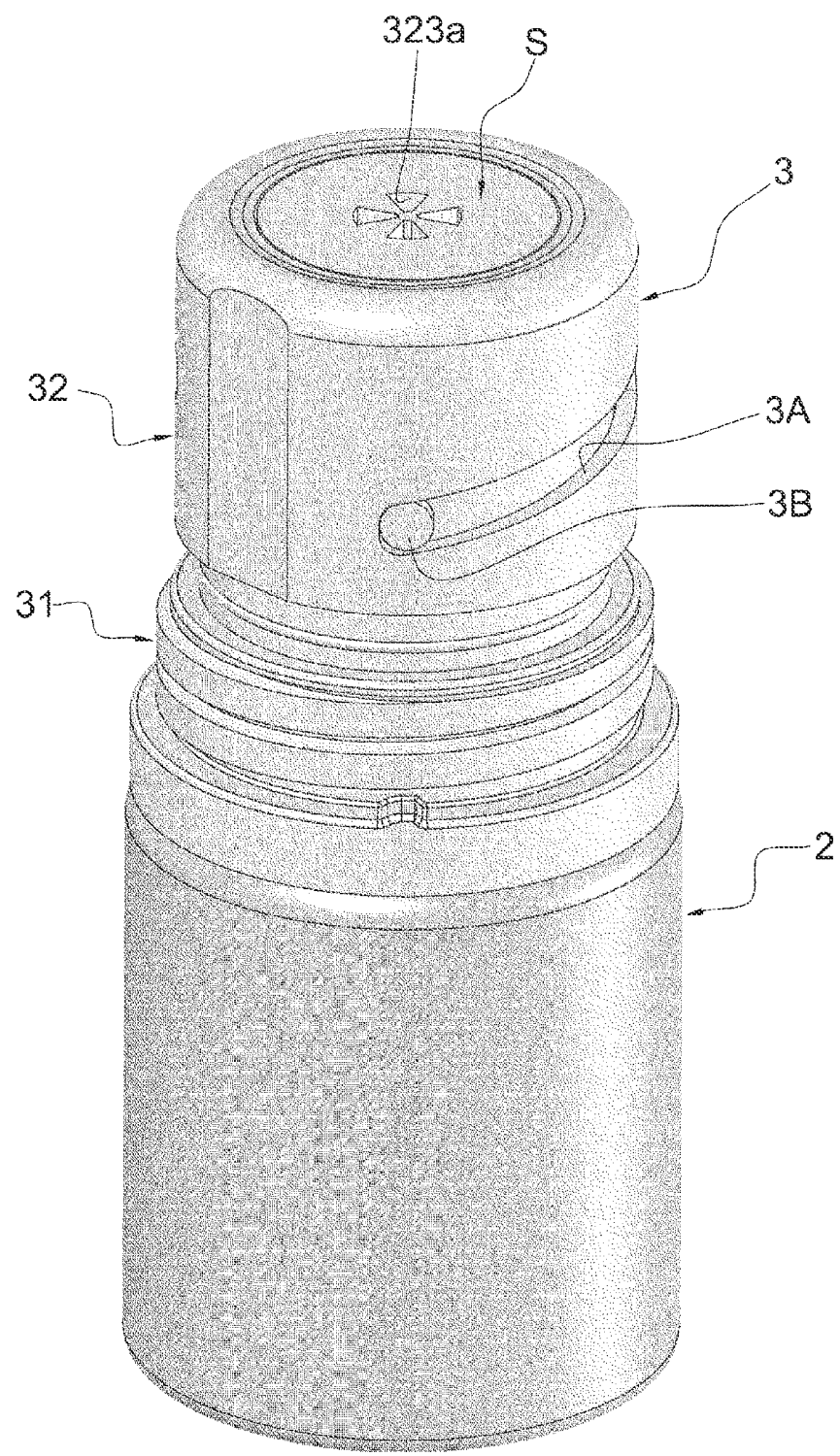
FIG. 5 is a perspective view of the container of FIG. 1 as found when the head has been operated such that the measurement space is at its maximum.
Figure 6:
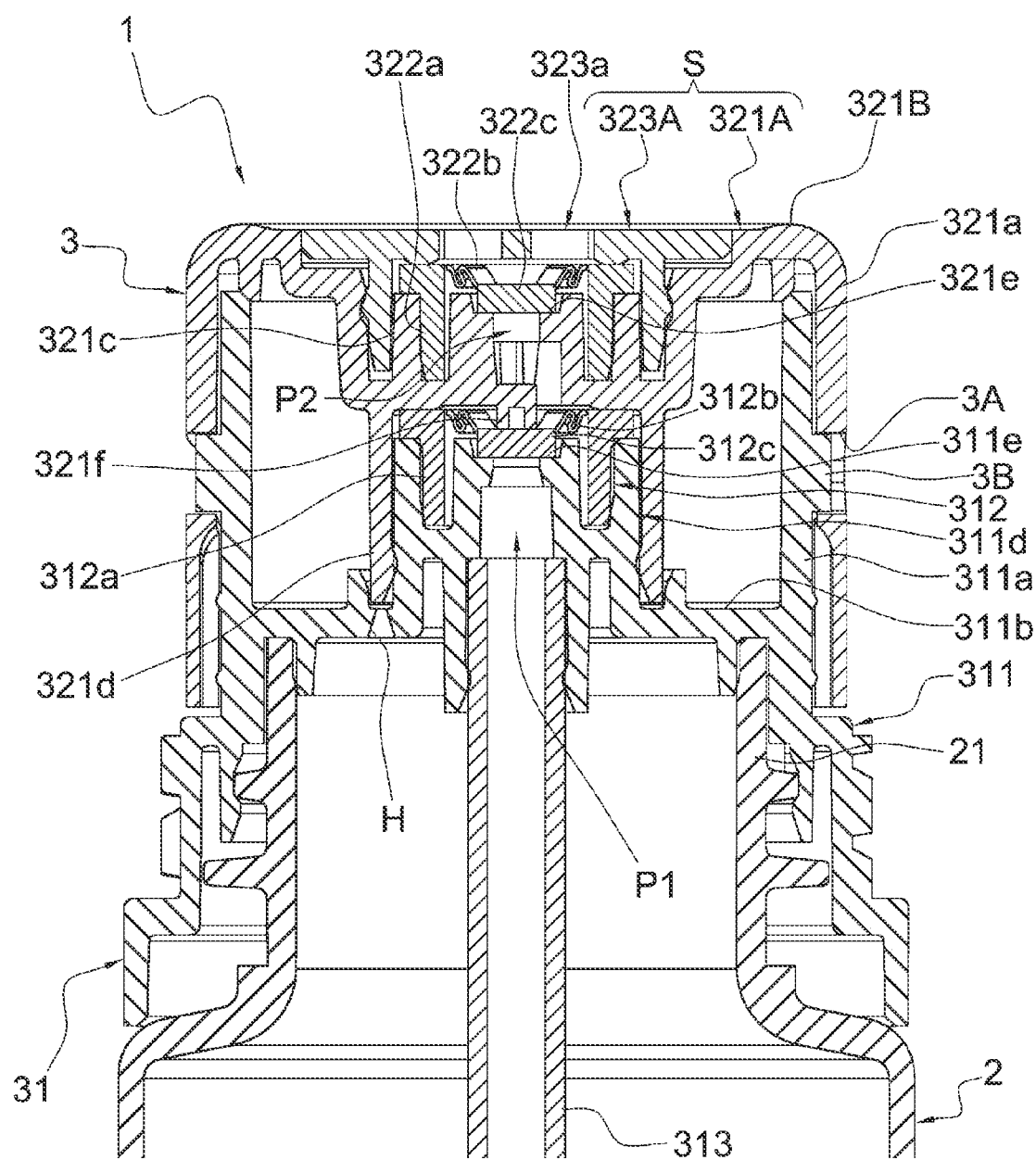
FIG. 6 is an enlarged longitudinal cross-sectional view of main components of the container of FIG. 1 as found when the head has been operated such that the measurement space is at its minimum.

The space surrounded by the base cylinder 311d and head cylinder 321d constitutes the measurement space; when the head 32 is at its lowest position shown in FIGS. 4 and 6, the volume of the measurement space is approximately 0 mL. On the other hand, when the head 32 is at its highest position shown in FIGS. 5 and 7, the volume of the measurement space is equal to the maximum volume of the composition that can be measured. It is understood that, if a predetermined fixed amount or an arbitrary amount is to be measured, it is not necessary to continue the rotation operation for pulling the head 32 up to the highest position; for example, if the amount taken for one use is half the maximum amount of the composition that can be measured, the user can perform the measurement operation by rotating the head by about a half turn from the lowest position while observing the guide groove 3A.

A valve lock portion 321f is provided on the lower end of the cylindrical discharge portion 321c, where, when the head 32 is at its lowest position, the valve lock portion pushes the upper surface of the valve body 312c of the first check valve 312 so as to press the valve body 312c against the valve seat 311e.

The second check valve 322 includes a generally cylindrical valve base 322a and a valve body 322c shaped as a disk and supported by elastic supports 322b so as to be elastically movable in axial directions inside the valve base 322a. In the implementation shown, the cylindrical discharge portion 321c is constructed as a double cylinder, and the valve base 322a is fitted into the outer cylindrical side of the cylindrical discharge portion 321c in a liquid-tight manner. A flange is formed integrally with the top end of the valve base 322a to extend outwardly in radial directions, the flange being in contact with the upper end surface of the outer cylindrical side of the cylindrical discharge portion 321c.

The second check valve 322 may be made of silicone, for example. To ensure that there is a passage for the composition between the peripheral side of the valve body 322c and the inner peripheral side of the valve base 322a and ensure that the valve body 322c is elastically supported in a stable manner, a plurality of elastic supports 322b are preferably arranged circumferentially with an equal distance; for example, three elastic supports 322b may be arranged circumferentially with an equal distance.

An annular valve seat 321e is provided at the upper end of the cylindrical discharge portion 321c and at the opening of the second passageway P2 in such a manner that, when the peripheral edge of the lower surface of the valve body 322c of the second check valve 322 contacts the valve seat 321e, the second passageway P2 is sealed. The elastic supports 322b are biased so as to push the valve body 322c onto the valve seat 321e from the top (i.e., secondary side) toward the bottom (i.e., primary side) as viewed in FIG. 1. The biasing forces are relatively weak; thus, when an operation of the head 32 creates a positive pressure in the measurement space relative to the outside, the difference between the pressure on the secondary side (i.e., upper surface) of the valve body 322c and the pressure on the primary side (i.e., lower surface) causes the valve body 322c to leave the valve seat 321e against the biasing forces.

The liquid holder 323 is fitted onto the recessed top plate of the head body 321 so as to cover the second check valve 322, and is generally concave in shape as a whole where the top surface of the liquid holder 323 and the top plate of the head body 321 are integral and generally flush, and an embankment is provided on the top plate of the head body 321. Liquid discharge outlets 323a are provided around the center of the liquid holder 323 such that the composition, passing through the second check valve 322, is discharged through the liquid discharge outlets 323a so as to stay on the upper surface of the liquid holder 323, and is held on the liquid holder 323 by virtue of the viscosity of the composition itself and the wettability of the application surface S.

A cap 4 is detachably mounted on the base body 311 to cover the entire measurement mechanism 3 from above to prevent the head 32 from inadvertently being rotated during storage and to cover the upper surface of the liquid holder 323.

As shown in FIG. 4, the container 1 of the present embodiment includes an application surface S. The application surface S of the present embodiment includes the upper surface 323A of the liquid holder 323, and the upper surface periphery 321A of the head body 321. The upper surface periphery 321A of the head body 321 is positioned peripherally to surround the upper surface 323A of the liquid holder 323. As shown in FIG. 4, four liquid discharge outlets 323a are provided around the center of the application surface S, the liquid discharge outlets being generally triangular in shape as viewed in a plan view and arranged annularly. As the second passageway P2 is branched out into four sub-passages toward the liquid discharge outlets 323a, the liquid composition can be prevented from spurting upon a quick discharge operation. The application surface S has substantially no recesses nor projections except for the liquid discharge outlets 323a, where all of its portions are generally flush, and is circular in shape in a plan view. Further, the members forming the application surface S (in the present embodiment, the liquid holder 323 and head body 321) are hard members. The application surface S is surrounded by the embankment 321B on its outer periphery; in the present embodiment, the embankment 321B is provided on the head body 321. As a result, the application surface S and embankment 321B as a whole constitute a generally concave composition-holding member. The diameter of the application surface S of the container 1 of the present embodiment is 34 mm.

As shown in FIG. 4, the container 1 of the present embodiment is generally cylindrical in shape. However, the present invention is not limited to such a shape; the container body may be generally shaped as, for example, a polygonal tube such as a triangular tube, a rectangular tube, or a pentagonal tube. Further, as shown in FIG. 4, the bottom of the container body of the container 1 of the present embodiment is generally flat in shape with a slight recess in the middle; however, any appropriate changes may be made to the design.

In the container 1 of the present embodiment, the valve body 312c of the first check valve 312 has such an outer-surface geometry that the sealability against the valve seat 311e increases with increasing pressure in the measurement space. In the present embodiment, the valve seat 311e on the first passageway P1 is generally flat in shape, and the valve body 312c is shaped as a disk adapted to abut the valve seat 311e from the secondary side (i.e., from above in the drawing), and has an upper surface that receives pressure in the measurement space so as to increase sealability. Further, in the present embodiment, only the upper surface and peripheral surface of the disk-shaped valve body 312c are exposed to the measurement space when it closes the valve seat 311e, while the lower surface of the valve body 312c abuts the valve seat 311e and is not exposed to the measurement space. As a result of this construction, when the measurement space is pressurized to generate a positive pressure, only forces in such directions as to press the valve body 312c onto the valve seat 311e are applied to the valve body 312c, thereby ensuring that the valve is closed. Thus, even if the user tilts, or shakes to some degree, the container during the measurement operation, the valve body 312c is prevented from leaving the valve seat 311e, thus preventing backflow of the composition from the measurement space.

Further, in the present embodiment, an outside-air inlet H is provided in the base body 311 for communicating the internal space of the container body 2 with outside air. More specifically, the outside-air inlet H is located adjacent to the lowest portion of the base cylinder 311d and vertically extends through the partition 311b. The space around the outer peripheral side of the base cylinder 311d and above the partition 311b communicates with outside air via the gaps between the outer cylindrical sides 311a and 321a of the base body and head body (i.e., no seal is provided), and that space communicates with the internal space of the container body via the outside-air inlet H.

In the present embodiment, the mechanism is constructed such that, when the head 32 has been operated to reach the lowest position, the distal end of the head cylinder 321d closes the outside-air inlet H; when the head is even slightly operated away from that position to increase the measurement space, the outside-air inlet H is opened. Thus, in the present embodiment, the distal end of the head cylinder 321d functions as a plug for closing the outside-air inlet H.

Next, a typical exemplary use of the container 1 of the present embodiment, i.e., an exemplary use in an implementation where the maximum volume of the measurement space is equal to the volume of the composition taken for one use, is described. It is understood that the container 1 of the present embodiment may be used to measure an arbitrary amount and discharge it, and thus the container 1 is not limited to the following exemplary use. The maximum volume of the measurement space of the container 1 is 0.7 mL.

Figure 7:
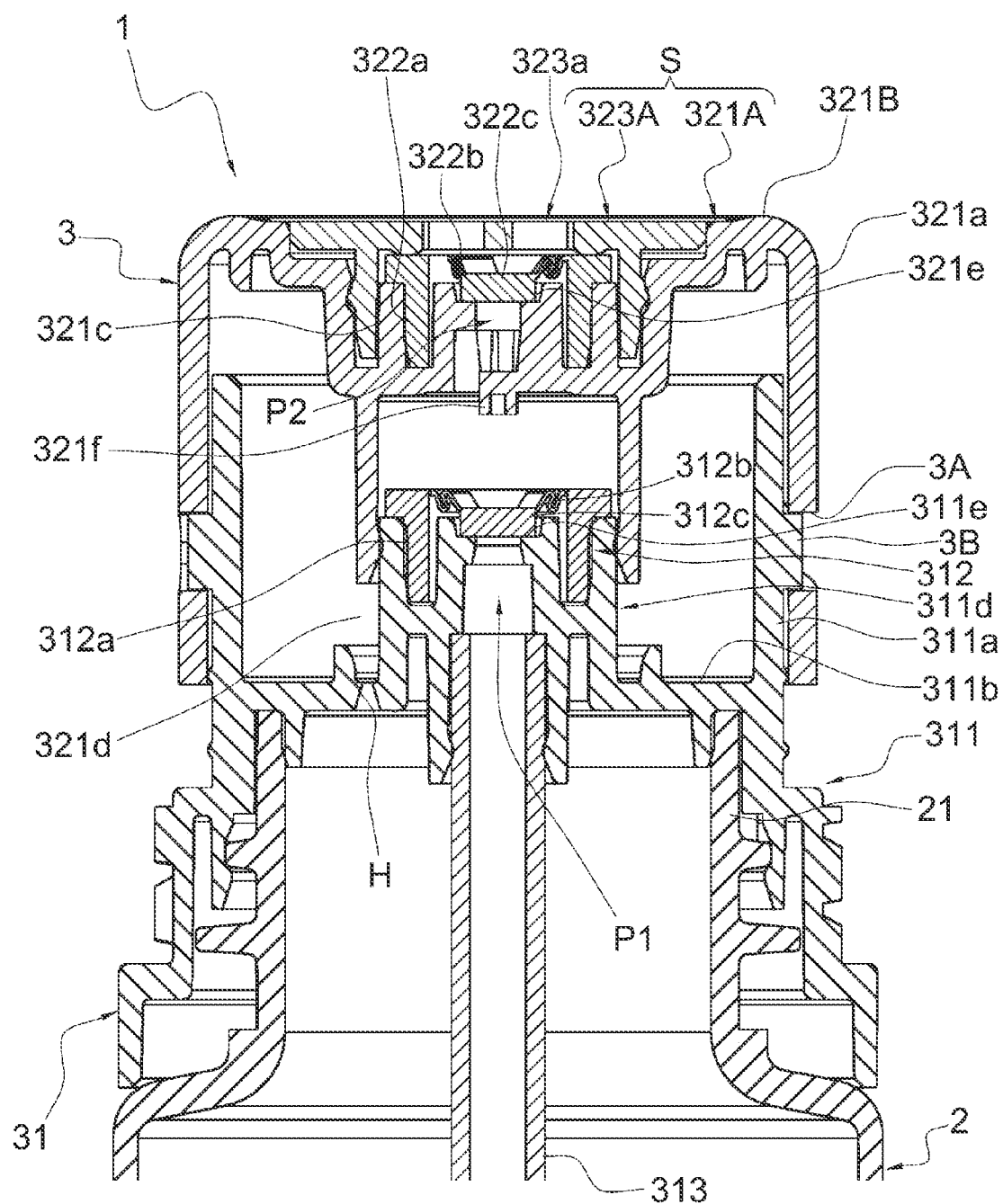
FIG. 7 is an enlarged longitudinal cross-sectional view of main components of the container of FIG. 1 as found when the head has been operated such that the measurement space is at its maximum.

To use the container 1 of the present embodiment, the cap 4 is removed and the head 32 is rotated from the state shown in FIGS. 4 and 6 (i.e., state with the minimum volume of the measurement space) to the state shown in FIGS. 5 and 7 (i.e., state with the maximum volume of the measurement space). This causes the head 32 to rise relative to the base 31 by a certain stroke such that the volume of the measurement space surrounded by the base cylinder 311d and head cylinder 321d increases to a predetermined maximum. As a result, a negative pressure is generated in the measurement space. At this time, the negative pressure causes the second check valve 322 to act to further increase sealability, while the difference between the outside pressure inside the container body 2 and the negative pressure in the measurement space causes the first check valve 312 to open such that the negative pressure in the measurement space sucks up the composition in the container body 2 to measure a predetermined fixed amount or an arbitrary amount of the composition into the measurement space. When the negative pressure in the measurement space is essentially eliminated, the biasing forces of the elastic supports 312b press the valve body 312c of the first check valve 312 against the valve seat 311e, thereby preventing the composition that has flown into the measurement space from flowing back into the container body (measurement operation).

Next, when the head 32 is rotated from the state shown in FIGS. 5 and 7 back to the state shown in FIGS. 4 and 6, the composition in the measurement space is pressurized to create a positive pressure in the measurement space. When the valve body 312c of the first check valve 312 receives pressure in the measurement space, its sealability increases; as it is, even if the user tilts the container during operation or shakes it to some degree, the first check valve 312 is prevented from opening, thereby preventing backward flow more reliably. On the other hand, when there is a positive pressure in the measurement space relative to the outside, the second check valve 322 can easily open such that the composition in the measurement space is discharged so as to stay on the application surface S (discharge operation).

Lastly, with this state being kept, the container is held and pressed onto a desired location on the body surface to apply the discharged composition thereto. For example, a pharmaceutical preparation can be applied to a location on the body such as an axilla (application operation).

The present invention is not limited to the above-described embodiment, and any appropriate changes may be made to the design.

Figure 9:
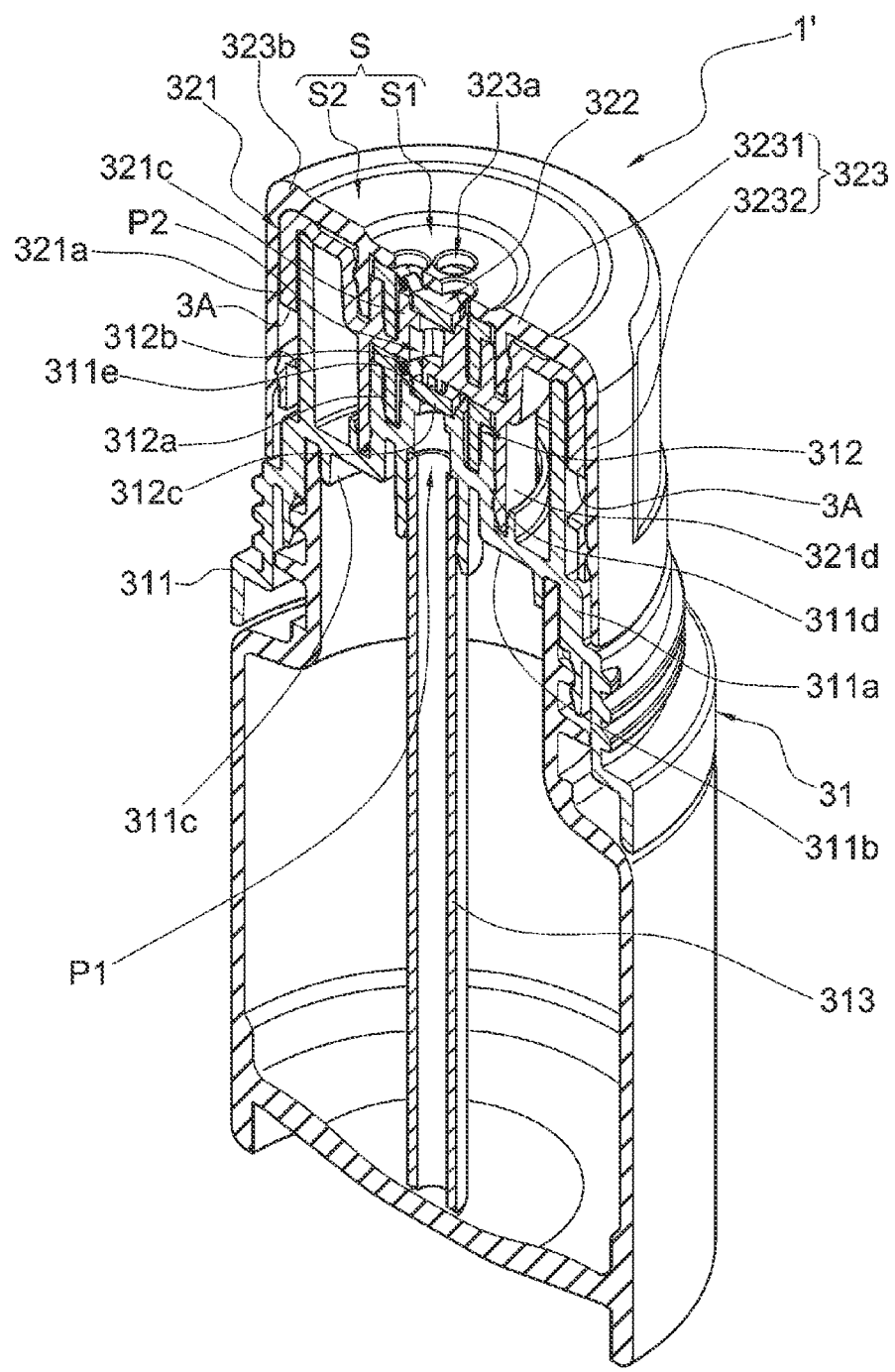
FIG. 9 is a longitudinal cross-sectional view of an entire quantitative dispensing container according to another embodiment of the present invention.
Figure 10:
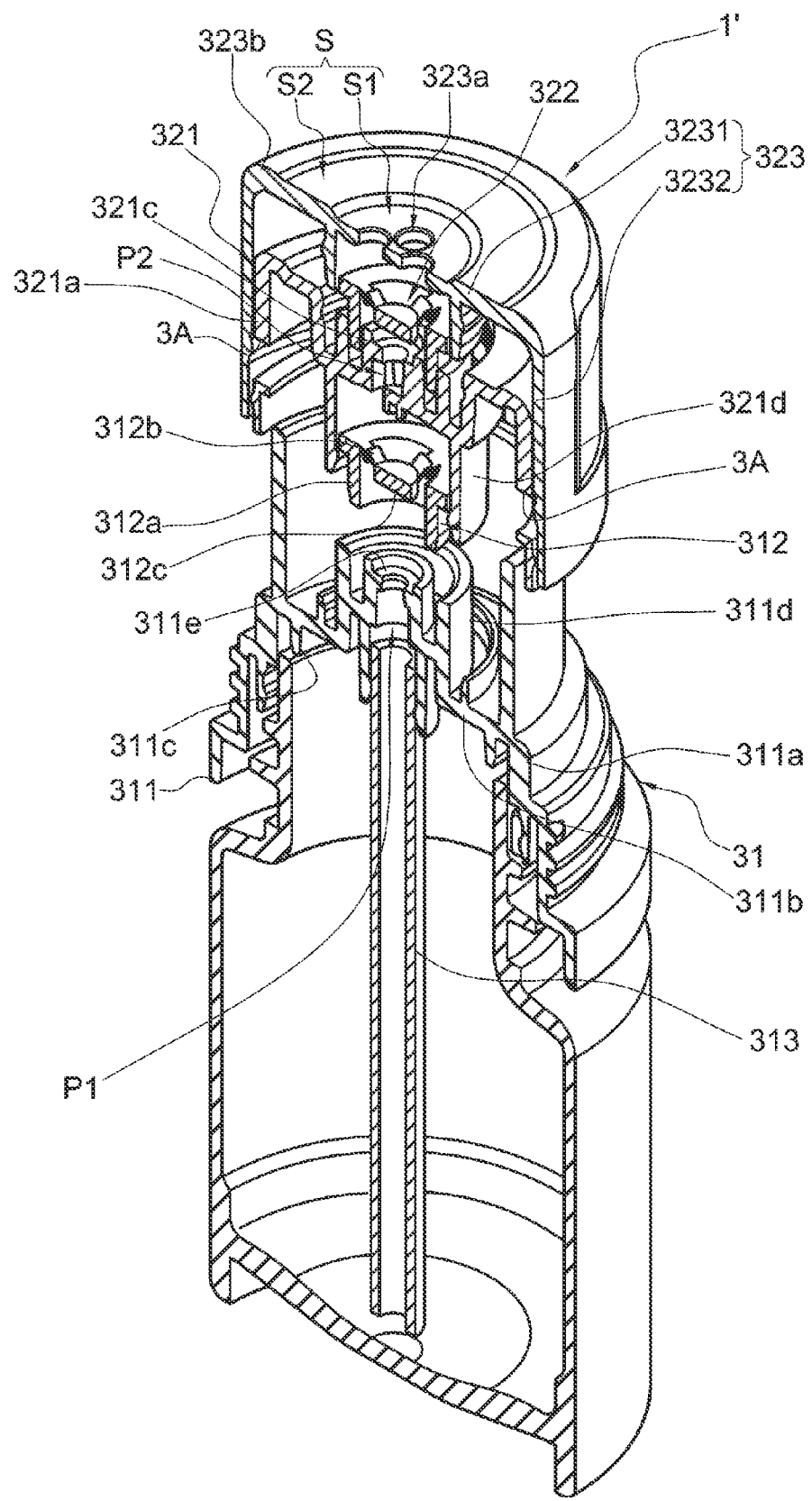
FIG. 10 is an exploded perspective longitudinal cross-sectional view of the container of FIG. 9.
Figure 11:
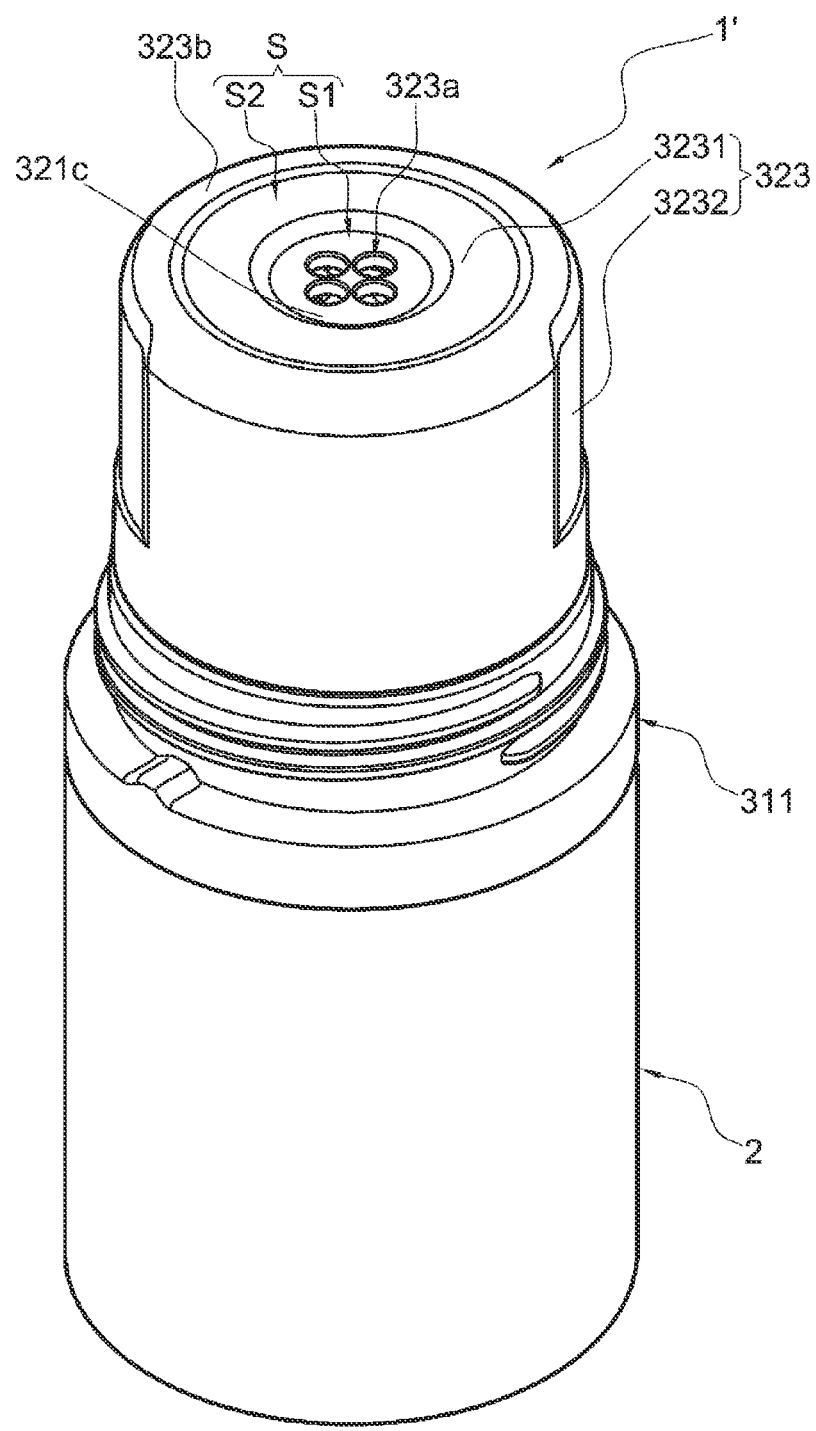
FIG. 11 is a perspective view of the container of FIG. 9 as found when the head has been operated such that the measurement space is at its minimum.

For example, FIGS. 9 to 11 show a container 1' constituting a quantitative dispensing container according to another embodiment of the present invention. The container 1' of the present embodiment is used to contain a liquid pharmaceutical preparation or cosmetic product that constitutes the composition and, in response to a predetermined measurement operation, discharge a predetermined fixed amount or an arbitrary amount of the composition so as to stay on the application surface and, with the discharged composition held thereon, apply it to the body surface of the user (for example, an axilla).

As for the container 1', the similar structure and effects as the above-described container 1 are labeled with the same reference characters and their detailed description is omitted, and only the different structures and effects are described below. The cap 4 is not shown in FIGS. 9 to 11.

In the container 1', the liquid holder 323, which is now integral with the head body 321, includes a top plate 3231 and a cylindrical peripheral wall 3232 extending downward from the periphery of the top plate 3231. The top plate 3231 covers the entire upper surface of the head body 321. The peripheral wall 3232 of the liquid holder 323 covers the entire outer peripheral surface of the outer cylindrical side 321a of the head body 321, where the holder's wall is located outward of the head body's side. Thus, mechanical portions such as the guide groove 3A are covered by the liquid holder 323 such that, even if the discharged composition on the application surface S drips along the peripheral wall 3232, the composition does not enter the guide groove 3A, which is easily cleaning after use and thus promote hygiene. Although the peripheral wall 3232 of this container 1' is located outward of the guide groove 3A to cover it, the container etc. of the present invention is not limited to such a construction; for example, only part of the outer peripheral surface of the outer peripheral side 321a may be covered by an external wall to allow the guide groove 3A to be visually observed. While the liquid holder 323 is not limited to any particular color or degree of transparency, a preferred liquid holder is transparent or opaque to allow the guide groove 3A to be visually observed from the outside, for example. Further, while the peripheral wall 3232 is preferably cylindrical in shape, it may be shaped as a polygonal tube, such as a triangular tube, a rectangular tube or pentagonal tube.

The application surface S of the container 1' is solely composed of the upper surface of the liquid holder 323. The application surface S of the container 1' includes a concave portion S1 located in the center, and an enlargement portion S2 that is annular in shape as viewed in a plan view and surrounds the concave portion S1. A plurality of liquid discharge outlets 323a are provided in the concave portion 51 and are open therein. The concave portion S1 is located slightly lower than the enlargement portion S2 such that the composition discharged through the liquid discharge outlets 323a is first held on the concave portion 51. The area and depth of the concave portion S1 preferably have such magnitudes that the surface can hold the amount of the composition discharged in a single measurement operation. Further, prior to application to the body surface of the user, the composition is spread to reach the enlargement portion S2 and is held thereon, enabling efficient application to the body surface using the entire application surface S. Each liquid discharge outlet 323a of the present embodiment has an opening that is circular in shape. Four liquid discharge outlets 323a are arranged annularly with an equal distance around the center of the concave portion S1.

The application surface S of the container 1' is surrounded by an embankment 323b provided in the vicinity of the periphery of the upper surface of the liquid holder 323. The structure of the embankment 323b is the same as the embankment 321b of the container 1, and its description is omitted. Although the protrusion 3B, outside-air inlet H and some other features are not visible in FIGS. 9 to 11 because FIGS. 9 to 11 show cross sections at different positions from those for FIGS. 1 and 2, the base 31 of the container 1' has the same structure as the base 31 of the container 1.

In the above-described embodiment, the head is attached to the base so as to be helically movable; in an alternative construction, the volume of the measurement space can be increased and reduced by a simple pull-up and push-in operations in axial directions. Further, in the above-described embodiment, the head cylinder functions as a plug for closing the outside-air inlet; alternatively, a plug that is a structurally separate member from the head cylinder may be provided.

Further, although the valve body of the first check valve is preferably shaped as a disk, the valve body is not limited to such a shape, and a valve body with a geometry or structure with design changes that do not depart from the spirit of the present invention may be employed. For example, a valve body may be a shaped as a semisphere including a secondary side generally shaped as a spherical surface and a primary side generally shaped as a flat surface.

EXPLANATION OF CHARACTERS

1: quantitative dispensing container
2: container body
3: measuring mechanism
31: base
312: first check valve
312b: elastic supports
312c: valve body
32: head 322: second check valve
P1: first passageway
P2: second passageway
H: outside-air inlet

EXAMPLES

Hereinafter, the present invention is described yet more specifically using examples.

<Test Example 1> Determination of Precision in Discharge Depending on Viscosity of Liquid Composition and Tilt During Discharge (1)

The quantitative dispensing container of the present invention shown in FIG. 1 was filled with preparations with different viscosities (HPMC aqueous solutions and HPC ethanol solutions). The container was positioned upright during measurement, whereas the container was positioned upright, horizontal or inverted during discharge depending on the preparation, and the maximum amount that could be measured was measured and discharged. The measurement and discharge operations were repeated ten times and the average amount of discharge, as well as the standard deviation and coefficient of variation thereof (CV value) were calculated. As used herein, "upright" means that the container is placed as shown in FIG. 9 during operation; "horizontal" means that the container is tilted approximately 90 degrees relative to the upright position during operation; and "inverted" means that the container is tilted approximately 180 degrees relative to the upright position during operation.

Viscosity was measured by a conical and flat-plate shaped rotation-type viscometer, RE550-type viscometer from Toki Sangyo Co., Ltd., under the following conditions.

TABLE 1

| Measurement Conditions | |
|---|---|
| Measurement temperature | 25° C. |
| Pre-heating time | 30 sec |
| Specimen measured | 1 mL |
| Cone rotor (R-H1°34' × R24) | angle: 1°34', radius: 24 mm |
| Number of revolutions | 0.1-5 rpm |

<Results of Evaluation of Precision in Measurement and Discharge for HPMC Aqueous Solutions>

TABLE 2

| Rx. no. | HPMC content | Viscosity (mPa · s) | Angle of container during discharge | Average (g) | Standard deviation (g) | CV (%) |
|---|---|---|---|---|---|---|
| 1 | 2.00% | 91880 (0.1 rpm*) | upright | 0.5322 | 0.0082 | 1.54 |
| | | | horizontal | 0.5360 | 0.0048 | 0.90 |
| | | | inverted | 0.5296 | 0.0036 | 0.68 |
| 2 | 0.25% | 26 (5 rpm*) | upright | 0.5702 | 0.0067 | 1.18 |
| | | | horizontal | 0.5505 | 0.0114 | 2.07 |
| | | | inverted | 0.5378 | 0.0089 | 1.65 |
| 3 | 0% (water) | — | upright | 0.5584 | 0.0109 | 1.95 |
| | | | horizontal | 0.5584 | 0.0096 | 1.72 |
| | | | inverted | 0.5508 | 0.0059 | 1.07 |

—: means that viscosity was so low that it could not be measured by the viscometer used.
*number of revolutions as a viscosity-measurement condition <Results of Evaluation of Precision in Measurement and Discharge for HPC Ethanol Solutions>

TABLE 3

| Rx. no. | HPC content | Viscosity (mPa · s) | Angle of container during discharge | Average (g) | Standard deviation (g) | CV (%) |
|---|---|---|---|---|---|---|
| 4 | 6% | measurement impossible | upright | 0.1813 | 0.0423 | 23.33 |
| 5 | 4% | 33380 (1 rpm*) | upright | 0.4177 | 0.0029 | 0.69 |
|   |    |                | horizontal | 0.4271 | 0.0039 | 0.91 |
|   |    |                | inverted | 0.4293 | 0.0047 | 1.09 |
| 6 | 1% | 159 (5 rpm*) | upright | 0.4500 | 0.0025 | 0.56 |
|   |    |              | horizontal | 0.4503 | 0.0035 | 0.78 |
|   |    |              | inverted | 0.4502 | 0.0047 | 1.04 |
| 7 | 0% (EtOH) | — | upright | 0.4396 | 0.0209 | 4.75 |
|   |           |   | horizontal | 0.4615 | 0.0067 | 1.45 |
|   |           |   | inverted | 0.4598 | 0.0071 | 1.54 |

—: means that viscosity was so low that it could not be measured by the viscometer used.
*number of revolutions as a viscosity-measurement condition As demonstrated above, all the prescriptions except for Prescription 4 had sufficiently low CV values, regardless of the container angle during discharge. This demonstrates that the quantitative dispensing container of the present invention exhibits high discharge precision for a very wide viscosity range, from a low viscosity of approximately 0 mPa·s to a high viscosity of 85,000 mPa·s. Further, Prescriptions 1 to 3 were aqueous solutions, while Prescriptions 5 to 7 were non-aqueous solutions (ethanol solutions), and had sufficiently low CV values independent of the nature of solvent. That is, it demonstrated that the measuring mechanism etc. of the present invention exhibits high measurement precision and discharge precision independent of the nature of solvent. Further, the thickeners of Prescriptions 1 to 3 were HPC, while the thickeners of Prescriptions 5 to 7 were HPMC, which means that the CV value was sufficiently low independent of the type of thickener. That is, it demonstrated that the measuring mechanism etc. of the present invention exhibits high measurement precision and discharge precision independent of the type of thickener.

<Test Example 2> Determination of Precision in Discharge Depending on Viscosity of Liquid Composition and Tilt During Discharge (2)

The quantitative dispensing container according to the present invention shown in FIG. 9 was filled with preparations with different viscosities (HPMC aqueous solutions and HPC ethanol solutions). The test methodology and viscosity measurement methodology were the same as for Test Example 1.

<Results of Evaluation of Precision in Measurement and Discharge for HPMC Aqueous Solutions>

TABLE 4

| Rx. no. | HPMC content | Viscosity (mPa · s) | Angle of container during discharge | Average (g) | Standard deviation (g) | CV (%) |
|---|---|---|---|---|---|---|
| 1 | 2.00% | 79380 (0.1 rpm*) | upright | 0.5852 | 0.0100 | 1.71 |
|   |       |                  | horizontal | 0.5862 | 0.0104 | 1.77 |
|   |       |                  | inverted | 0.5860 | 0.0136 | 2.32 |
| 2 | 0.25% | 22 (5 rpm*) | upright | 0.6141 | 0.0107 | 1.75 |
|   |       |             | horizontal | 0.5978 | 0.0094 | 1.56 |
|   |       |             | inverted | 0.6010 | 0.0115 | 1.91 |
| 3 | 0% (water) | — | upright | 0.6100 | 0.0087 | 1.43 |
|   |            |   | horizontal | 0.6125 | .00091 | 1.49 |
|   |            |   | inverted | 0.6093 | 0.0087 | 1.43 |

—: means that viscosity was so low that it could not be measured by the viscometer used.
*number of revolutions as a viscosity-measurement condition <Results of Evaluation of Precision in Measurement and Discharge for HPC Ethanol Solutions>

TABLE 5

| Rx. no. | HPC content | Viscosity (mPa · s) | Angle of container during discharge | Average (g) | Standard deviation (g) | CV (%) |
|---|---|---|---|---|---|---|
| 5 | 4% | 40130 (1 rpm*) | upright | 0.4721 | 0.0027 | 0.56 |
|   |    |                | horizontal | 0.4717 | 0.0054 | 1.14 |
|   |    |                | inverted | 0.4650 | 0.0033 | 0.71 |
| 6 | 1% | 192 (5 rpm*) | upright | 0.4785 | 0.0065 | 1.36 |
|   |    |              | horizontal | 0.4790 | 0.0051 | 1.07 |
|   |    |              | inverted | 0.4775 | 0.0050 | 1.05 |
| 7 | 0% (EtOH) | — | upright | 0.4729 | 0.0073 | 1.55 |
|   |           |   | horizontal | 0.4623 | 0.0075 | 1.62 |
|   |           |   | inverted | 0.4829 | 0.0116 | 2.40 |

—: means that viscosity was so low that it could not be measured by the viscometer used.
*number of revolutions as a viscosity-measurement condition As demonstrated above, the container in FIG. 9 according to the present invention had sufficiently low CV values regardless of the container angle during discharge, the nature of solvent and the type of thickener, which demonstrated that such a container exhibits high measurement precision and discharge precision.

The invention claimed is:

1. A measuring mechanism for measuring a liquid composition,
the measuring mechanism including a base and a head defining a measurement space between the base and the head,
the base including a first passageway adapted to allow the liquid composition to flow from a supplier into the measurement space, and a first check valve located on the first passageway,
the head including a second passageway adapted to discharge the composition inside the measurement space to an outside, and a second check valve located on the second passageway, and
the measuring mechanism adapted to discharge a measured amount of the composition to the outside in response to a predetermined operation of the head including a measurement operation for increasing a volume of the measurement space and a discharge operation for reducing the volume of the measurement space, the measured amount being a predetermined fixed amount or an arbitrary amount,
wherein a valve body of the first check valve is shaped as a disk made of a material containing silicone, and only an upper surface and a peripheral surface of the valve body are exposed to the measurement space when pressures in the measurement space and the supplier are substantially equal or when pressure in the measurement space is a positive pressure relative to pressure in the supplier.

2. The measuring mechanism according to claim 1, wherein the head adapted to, during the measurement operation, be pulled up relative to the base to open the first check valve while the second check valve remains closed such that the liquid composition flows into the measurement space defined by the base and the head to measure the predetermined fixed amount or the arbitrary amount, and the head adapted to, during the discharge operation, be pushed down relative to the base such that the first check valve is closed and the second check valve is opened to discharge the measured amount of the composition to the outside.

3. The measuring mechanism according to claim 1, wherein a valve seat is provided on the first passageway, a valve body of the first check valve being located closer to the measurement space than the valve seat is, and the first check valve is a check valve adapted to:

a) be closed by the valve body of the first check valve abutting the valve seat on the first passageway in a direction toward the supplier away from the measurement space when the pressures in the measurement space and the outside are substantially equal, and b) be opened when the pressure in the measurement space is a negative pressure relative to the pressure in the supplier, and wherein a valve seat is provided on the second passageway, a valve body of the second check valve being located closer to the outside than the valve seat is, and the second check valve is a check valve adapted to:

c) be closed by the valve body of the second check valve abutting the valve seat on the second passageway in a direction toward the measurement space away from the outside when the pressures in the measurement space and the outside are substantially equal, and d) be opened when the pressure in the measurement space is a positive pressure relative to the pressure in the outside.

4. The measuring mechanism according to claim 3, wherein the valve seat on the first passageway is flat, and the first check valve is further configured to:

f) increase sealability when pressure in the measurement space is a positive pressure relative to pressure in the supplier.

5. The measuring mechanism according to claim 1, wherein the first check valve has an elastic support adapted to support a periphery of the valve body so as to bias the valve body toward the valve seat.

6. The measuring mechanism according to claim 1, wherein the composition is a composition to be applied to a body surface of a human, the composition being a pharmaceutical preparation or a cosmetic product offered in the form of a liquid preparation, a lotion preparation, a cream preparation, an ointment preparation, a light ointment preparation, a foam preparation, a liniment preparation, or a gel preparation.

7. The measuring mechanism according to claim 1, wherein the composition is a pharmaceutical preparation having a viscosity at 25° C. not higher than 100000 mPa·s.

8. The measuring mechanism according to claim 1, wherein the composition is a pharmaceutical preparation having a viscosity at 25° C. not higher than 95000 mPa·s.

9. The measuring mechanism according to claim 1, wherein the composition is a pharmaceutical preparation having a viscosity at 25° C. not higher than 30000 mPa·s.

10. The measuring mechanism according to claim 1, wherein the composition is a pharmaceutical preparation having a viscosity at 25° C. not higher than 1000 mPa·s.

11. The measuring mechanism according to claim 1, wherein the composition is a pharmaceutical preparation to be applied to a body surface of a human to cure, prevent or treat mycosis, tinea unguium, atopic dermatitis, psoriasis, pruritus, pain, rosacea, wounds, decubitus, epidermolysis bullosa, xeroderma pigmentosum, congenital leukopathia, hypogonadism, or hyperhidrosis.

12. The measuring mechanism according to claim 1, wherein the composition is a pharmaceutical preparation to be applied to a body surface of a human to cure, prevent or treat mycosis, hypogonadism, or hyperhidrosis.

13. The measuring mechanism according to claim 12, wherein the composition is a pharmaceutical preparation to be applied to an axilla of a human to cure, prevent or treat hypogonadism or hyperhidrosis.

14. A quantitative dispensing container including a container body for preserving the liquid composition and the measuring mechanism according to claim 1, wherein the measuring mechanism is mounted on the container body, the measuring mechanism including the base attached to the container body and the head defining the measurement space between the base and the head, the base and the head constructed such that the volume of the measurement space is changeable by an operation of the head, the first check valve of the base including a valve body having such an outer-surface geometry that a sealability of the first check valve increases as a pressure inside the measurement space increases.

15. The quantitative dispensing container according to claim 14, wherein a flat valve seat is provided on the first passageway, the valve body of the first check valve is shaped as a plate adapted to abut the valve seat in a direction toward the container body away from the measurement space and has an upper surface adapted to receive a pressure in the measurement space so as to increase sealability.

16. The quantitative dispensing container according to claim 15, wherein the valve body of the first check valve is shaped as a disk, and only the upper surface and a peripheral surface are exposed to the measurement space when the pressure in the measurement space and the pressure in the outside are substantially equal or when the pressure in the measurement space is a positive pressure relative to the pressure in the outside.

17. The quantitative dispensing container according to claim 15, wherein the first check valve includes an elastic support adapted to support a periphery of the valve body so as to bias the valve body toward the valve seat.

18. The quantitative dispensing container according to claim 14, wherein an outside-air inlet is provided in the base or the container body, the outside-air inlet is adapted to communicate an interior of the container body with outside air, the first check valve is adapted to operate to become open by virtue of a difference between a negative pressure inside the measurement space generated as the volume of the measurement space has been increased by an operation of the head, on one hand, and an outside pressure within the container body, on the other, and the second check valve is adapted to operate to become open by virtue of a difference between a pressure inside the measurement space generated when the volume of the measurement space has been reduced by an operation of the head, on one hand, and the outside pressure, on the other.

19. The quantitative dispensing container according to claim 18, wherein
the outside-air inlet is located in the base,
a plug being provided in the head for closing the outside-air inlet when the volume of the measurement space is at a minimum, and opening the outside-air inlet when the head has been operated to increase the measurement space.

20. The quantitative dispensing container according to claim 19, wherein the plug is formed by a distal end of a cylinder defining the measurement space.

21. A quantitative applicator including the measuring mechanism and an application surface, wherein the measuring mechanism is the measuring mechanism according to claim 1, and
the application surface is an application surface provided on an upper side of the head to hold the measured amount of the composition discharged by the predetermined operation of the head so as to be applied to a body surface.

22. The quantitative applicator according to claim 21, wherein the application surface is an upper surface of a head body, an upper surface of a liquid holder provided on the upper side of the head body, or a combination of an upper surface of the head body and an upper surface of the liquid holder.

23. The quantitative applicator according to claim 21, wherein the application surface is only constructed by an upper surface of a liquid holder provided on the upper side of a head body.

24. The quantitative applicator according to claim 21, wherein the second passageway includes one or more liquid discharge outlets open in the application surface.

25. The quantitative applicator according to claim 24, wherein a plurality of liquid discharge outlets for the second passageway are located in a middle of the application surface.

26. The quantitative applicator according to claim 24, wherein the application surface is a flat surface, a concave surface or a convex surface having no hole nor projection except for the liquid discharge outlet for the second passageway.

27. The quantitative applicator according to claim 21, wherein a shape of the application surface as viewed in a plan view is a circle or an ellipse.

28. The quantitative applicator according to claim 27, wherein the shape of the application surface as viewed in a plan view is a circle with a diameter of 20 mm to 45 mm, or an ellipse with a minor axis and a major axis of 20 mm to 45 mm.

29. The quantitative applicator according to claim 21, wherein a shape of the application surface as viewed in a plan view is a circle with a diameter of 20 mm to 45 mm or an ellipse with a minor axis and a major axis of 20 mm to 45 mm, the application surface is a flat surface, a concave surface or a convex surface having no hole nor projection except for the liquid discharge outlet, and the application surface is surrounded by an embankment provided on an outer periphery of the application surface.

30. A quantitative dispensing container including a container body capable of containing the liquid composition and a quantitative applicator,
wherein the quantitative applicator is the quantitative applicator according to claim 1,
wherein the base of the measuring mechanism included in the quantitative applicator is a base attached to the container body, and the measurement space and an interior of the container body are capable of communicating with each other via the first passageway, the interior of the container body constituting the supplier.

31. The quantitative dispensing container according to claim 30, wherein an outside-air inlet for communicating the interior of the container body with outside air is provided in the base or the container body.

32. The quantitative dispensing container according to claim 31, wherein the outside-air inlet is provided in the base, and
a plug is provided in the head for closing the outside-air inlet when the volume of the measurement space is at a minimum, and opening the outside-air inlet when the head has been operated to increase the measurement space.

33. A method for curing, preventing or treating a disease in a human by applying a pharmaceutical preparation on a body surface of the human, comprising:
a) providing a quantitative dispensing container including a container body capable of containing a liquid pharmaceutical preparation and a measuring mechanism mounted on the container body,
the measuring mechanism including a base attached to the container body and a head defining a measurement space between the base and the head,
the measuring mechanism including an application surface adapted to apply the pharmaceutical preparation to the body surface,
the base including a first passageway adapted to allow the pharmaceutical preparation to flow from an interior of the container body into the measurement space, and a first check valve located on the first passageway,
the head including a second passageway adapted to discharge the pharmaceutical preparation inside the measurement space such that the pharmaceutical preparation stays on the application surface, and a second check valve located on the second passageway,
the measuring mechanism adapted to discharge a measured amount of the pharmaceutical preparation to an outside in response to a predetermined operation of the head including a measurement operation for increasing a volume of the measurement space and a discharge operation for reducing the volume of the measurement space, the measured amount being a predetermined fixed amount or an arbitrary amount,
wherein a valve body of the first check valve is shaped as a disk made of a material containing silicone, and only an upper surface and a peripheral surface of the valve body are exposed to the measurement space when pressure in the measurement space and pressure in the supplier are substantially equal or when the pressure in the measurement space is a positive pressure relative to the pressure in the supplier;
b) measuring the predetermined fixed amount or the arbitrary amount by the first check valve being opened when the head is pulled up relative to the base while the second check valve remains closed such that the pharmaceutical preparation flows into the measurement space defined by the base and the head,
c) discharging the measured amount of the pharmaceutical preparation such that the pharmaceutical preparation stays on the application surface by the first check valve being closed and the second check valve being opened when the head is pushed down relative to the base; and d) applying the discharged pharmaceutical preparation on the application surface to the body surface.

34. The method according to claim 33, wherein the body surface is an axilla.

35. The method according to claim 33, wherein the disease is mycosis, psoriasis, atopic dermatitis, pruritus, hypogonadism, or hyperhidrosis.

36. A quantitative dispensing container including a container body for preserving a liquid composition and a measuring mechanism for measuring a liquid composition, wherein the measuring mechanism is mounted on the container body,
   the measuring mechanism including a base and a head defining a measurement space between the base and the head,
   the base including a first passageway adapted to allow the liquid composition to flow from a supplier into the measurement space, and a first check valve located on the first passageway,
   the head including a second passageway adapted to discharge the composition inside the measurement space to an outside, and a second check valve located on the second passageway, and
   the measuring mechanism adapted to discharge a measured amount of the composition to the outside in response to a predetermined operation of the head including a measurement operation for increasing a volume of the measurement space and a discharge operation for reducing the volume of the measurement space, the measured amount being a predetermined fixed amount or an arbitrary amount,
   the measuring mechanism including the base attached to the container body and the head defining the measurement space between the base and the head, the base and the head constructed such that the volume of the measurement space is changeable by an operation of the head, and
   the first check valve of the base including a valve body having such an outer-surface geometry that a sealability of the first check valve increases as a pressure inside the measurement space increases,
   wherein a flat valve seat is provided on the first passageway, the valve body of the first check valve is shaped as a plate adapted to abut the valve seat in a direction toward the container body away from the measurement space and has an upper surface adapted to receive a pressure in the measurement space so as to increase sealability.

37. The quantitative dispensing container according to claim 36, wherein the first check valve includes an elastic support adapted to support a periphery of the valve body so as to bias the valve body toward the valve seat.

38. A quantitative dispensing container including a container body for preserving a liquid composition and a measuring mechanism for measuring a liquid composition, wherein the measuring mechanism is mounted on the container body,
   the measuring mechanism including a base and a head defining a measurement space between the base and the head,
   the base including a first passageway adapted to allow the liquid composition to flow from a supplier into the measurement space, and a first check valve located on the first passageway,
   the head including a second passageway adapted to discharge the composition inside the measurement space to an outside, and a second check valve located on the second passageway, and
   the measuring mechanism adapted to discharge a measured amount of the composition to the outside in response to a predetermined operation of the head including a measurement operation for increasing a volume of the measurement space and a discharge operation for reducing the volume of the measurement space, the measured amount being a predetermined fixed amount or an arbitrary amount,
   the measuring mechanism including the base attached to the container body and the head defining the measurement space between the base and the head, the base and the head constructed such that the volume of the measurement space is changeable by an operation of the head, and
   the first check valve of the base including a valve body having such an outer-surface geometry that a sealability of the first check valve increases as a pressure inside the measurement space increases,
   wherein a flat valve seat is provided on the first passageway, the valve body of the first check valve is shaped as a disk adapted to abut the valve seat in a direction toward the container body away from the measurement space and has an upper surface adapted to receive a pressure in the measurement space so as to increase sealability, and only the upper surface and a peripheral surface are exposed to the measurement space when pressure in the measurement space and pressure in the outside are substantially equal or when the pressure in the measurement space is a positive pressure relative to the pressure in the outside.

39. A quantitative dispensing container including a container body for preserving a liquid composition and a measuring mechanism for measuring a liquid composition, wherein the measuring mechanism is mounted on the container body,
   the measuring mechanism including a base and a head defining a measurement space between the base and the head,
   the base including a first passageway adapted to allow the liquid composition to flow from a supplier into the measurement space, and a first check valve located on the first passageway,
   the head including a second passageway adapted to discharge the composition inside the measurement space to an outside, and a second check valve located on the second passageway,
   the measuring mechanism adapted to discharge a measured amount of the composition to the outside in response to a predetermined operation of the head including a measurement operation for increasing a volume of the measurement space and a discharge operation for reducing the volume of the measurement space, the measured amount being a predetermined fixed amount or an arbitrary amount,
   the measuring mechanism including the base attached to the container body and the head defining the measurement space between the base and the head, the base and the head constructed such that the volume of the measurement space is changeable by an operation of the head, and
   the first check valve of the base including a valve body having such an outer-surface geometry that a sealability of the first check valve increases as a pressure inside the measurement space increases, wherein an outside-air inlet is provided in the base or the container body, the outside-air inlet is adapted to communicate an interior of the container body with outside air, the first check valve is adapted to operate to become open by virtue of a difference between a negative pressure inside the measurement space generated as the volume of the measurement space has been increased by an operation of the head, on one hand, and an outside pressure within the container body, on the other, and the second check valve is adapted to operate to become open by virtue of a difference between a pressure inside the measurement space generated when the volume of the measurement space has been reduced by an operation of the head, on one hand, and the outside pressure, on the other.

40. The quantitative dispensing container according to claim 39, wherein the outside-air inlet is located in the base,
a plug being provided in the head for closing the outside-air inlet when the volume of the measurement space is at a minimum, and opening the outside-air inlet when the head has been operated to increase the measurement space.

41. The quantitative dispensing container according to claim 40, wherein the plug is formed by a distal end of a cylinder defining the measurement space.

42. A quantitative dispensing container including a container body capable of containing a liquid composition and a quantitative applicator,
the quantitative applicator including a measuring mechanism for measuring a liquid composition and an application surface,
the measuring mechanism including a base and a head defining a measurement space between the base and the head,
the base including a first passageway adapted to allow the liquid composition to flow from a supplier into the measurement space, and a first check valve located on the first passageway,
the head including a second passageway adapted to discharge the composition inside the measurement space to an outside, and a second check valve located on the second passageway, and the measuring mechanism adapted to discharge a measured amount of the composition to the outside in response to a predetermined operation of the head including a measurement operation for increasing a volume of the measurement space and a discharge operation for reducing the volume of the measurement space, the measured amount being a predetermined fixed amount or an arbitrary amount, the application surface is an application surface provided on an upper side of the head to hold the measured amount of the composition discharged by the predetermined operation of the head so as to be applied to a body surface, wherein the base of the measuring mechanism included in the quantitative applicator is a base attached to the container body, and the measurement space and an interior of the container body are capable of communicating with each other via the first passageway, the interior of the container body constituting the supplier, and wherein an outside-air inlet for communicating the interior of the container body with outside air is provided in the base or the container body.

43. The quantitative dispensing container according to claim 42, wherein the outside-air inlet is provided in the base, and
a plug is provided in the head for closing the outside-air inlet when the volume of the measurement space is at a minimum, and opening the outside-air inlet when the head has been operated to increase the measurement space.

* * * * *